United States Patent [19]
Hirai

[11] Patent Number: 6,115,190
[45] Date of Patent: Sep. 5, 2000

[54] ZOOM LENS BARREL

[75] Inventor: Futoshi Hirai, Kawasaki, Japan

[73] Assignee: Canon Kabushiki Kaisha, Tokyo, Japan

[21] Appl. No.: 09/406,119

[22] Filed: Sep. 27, 1999

[30] Foreign Application Priority Data

Oct. 2, 1998 [JP] Japan .................................. 10-294688

[51] Int. Cl.⁷ ............................ G02B 15/14; G02B 07/02
[52] U.S. Cl. ........................... 359/694; 359/823; 359/700
[58] Field of Search .................................. 359/694, 699, 359/700, 701, 823

[56] References Cited

U.S. PATENT DOCUMENTS

| | | | |
|---|---|---|---|
| 5,373,397 | 12/1994 | Satoh et al. ............................... | 359/699 |
| 5,392,160 | 2/1995 | Satoh et al. ............................... | 359/695 |
| 5,461,443 | 10/1995 | Nakayama et al. ........................ | 396/89 |
| 5,467,227 | 11/1995 | Nomura ................................... | 359/694 |

*Primary Examiner*—Ricky Mack
*Attorney, Agent, or Firm*—Robin, Blecker & Daley

[57] ABSTRACT

A zoom lens barrel includes a fixed tube provided at a camera body, a first rotary tube arranged to move in an optical axis direction relative to the fixed tube and rotate around the optical axis, the first rotary tube having a helical groove formed on an inner surface thereof, a first rectilinear member disposed inside the first rotary tube and arranged to rectilinearly move in the optical axis direction integrally with the first rotary tube, a second rotary tube disposed inside the first rotary tube and arranged to rotate at the same amount of rotation as that of the first rotary tube, and a second rectilinear member disposed inside the second rotary tube, having a projecting part engaging the helical groove and prevented by the first rectilinear member from rotating around the optical axis, wherein the second rectilinear member moves in the optical axis direction according to a locus of the helical groove, thereby causing the second rotary tube to move in the optical axis direction.

16 Claims, 23 Drawing Sheets

ZOOM LENS BARREL

BACKGROUND OF THE INVENTION

1. Field of the Invention

The present invention relates to a zoom lens barrel.

2. Description of Related Art

Compact cameras currently in the market include such cameras that are using zoom lens barrels having a zoom ratio of three magnifications or thereabout. Some of the zoom lens barrels of this kind are of a three-stage draw-out lens-barrel structure which is arranged to make the whole lens barrel length approximately equal to the thickness of the camera body when the camera is not used for photo-taking.

The three-stage draw-out lens-barrel structure enables the camera to be arranged to have a so-called full-flat body when the camera is not used for photo-taking, despite the use of such a high zoom ratio of the zoom lens barrel as three magnifications. Three examples of zoom lens barrels of the three-stage draw-out lens-barrel structure were disclosed respectively in Japanese Laid-Open Patent Applications No. HEI 7-27963, No. HEI 8-211278 and No. HEI 8-248461, which hereinafter will be referred to as examples 1, 2 and 3 of conventional arrangement, respectively.

The zoom lens barrel in the example 1 of conventional arrangement is composed of a fixed tube which is fixedly mounted on a camera body, a first movable tube (a zoom driving ring) which is arranged within the fixed tube to be drawable out of the fixed tube, a second movable tube (a zoom cam ring) which is arranged within the first movable tube to be drawable out of the first movable tube, and a third movable tube (forward motion tube) which is arranged within the second movable tube to be drawable out of the second movable tube. Further, a rectilinear lead tube is disposed between the first and second movable tubes while a rectilinear tube is disposed on the inner side, i.e., on the optical axis side, of the third movable tube. The rectilinear lead tube is arranged to move along with the zoom driving ring in the optical axis direction while preventing the rotating motion of the third movable tube.

The zoom lens barrel in the example 2 of conventional arrangement is composed of a fixed tubular member, a first draw-out tube which is helicoid-coupled with the fixed tubular member, a second draw-out tube which is helicoid-coupled with the first draw-out tube, a third draw-out tube which is helicoid-coupled with the second draw-out tube, a rotary member which is arranged to be movable together with the first draw-out tube in the optical axis direction and to be rotatable relative to the first draw-out tube in such a way as to cause the second draw-out tube to rotate, and a rectilinear guide member which is arranged to be movable in the optical axis direction together with the second draw-out tube and to be rotatable relative to the second draw-out tube. The rotary member is thus arranged to move in the optical axis direction while transmitting a rotative driving force to the second draw-out tube.

The zoom lens barrel in the example 3 of conventional arrangement is composed of a fixed tube, a rear tube which is arranged inside of the fixed tube to be drawn out therefrom while being rotated, a rectilinear cam tube which is arranged on the inner side of the rear tube to move in the optical axis direction together with the rear tube, a rotary tube which is arranged on the inner side of the rectilinear cam tube to move together with the rear tube in the optical axis direction while being rotated, a rectilinear key which is arranged on the inner side of the rotary tube to move in the optical axis direction together with the rectilinear cam tube, an intermediate tube which is arranged on the inner side of the rotary tube to be drawn out while being rotated, a rectilinear member which is arranged on the inner side of the intermediate tube to move in the optical axis direction together with the intermediate tube, and a front tube which is arranged between the intermediate tube and the rectilinear member to be drawn out in the optical axis direction.

With the conventional zoom lens barrel arranged in the above-stated manner, a camera can be arranged to have a full flat body when the camera is not used for photo-taking and also to permit reduction in thickness thereof. However, the above examples 1, 2 and 3 of conventional arrangement have the following problems.

The zoom lens barrel in the example 1 of conventional arrangement makes it necessary to have a space solely for the rectilinear lead tube between the first and second movable tubes. This space hinders reduction in size of the lens barrel in the direction of its diameter. Another problem lies in that the rectilinear lead tube must be provided with a helical through-hole, which lowers the strength of the lens barrel.

In the zoom lens barrel in the example 2 of conventional arrangement, the rotary member, which corresponds to the rectilinear lead tube in the example 1 of conventional arrangement, is spatially allocated closer to the optical axis to facilitate reduction in size of the lens barrel in the direction of its diameter. However, the lead of the rotary member must be strictly arranged to have the rectilinear guide member move together with the second draw-out tube without rotating relative to the fixed tubular member. This requirement not only necessitates complex assembly work but also causes an increase in cost of manufacture.

The zoom lens barrel in the example 3 of conventional arrangement does not have any helical through-hole in the rectilinear key, which corresponds to the rectilinear lead tube in the example 1 of conventional arrangement. However, the rectilinear cam tube and the rotary tube are additionally included in the zoom lens barrel in the example 3 of conventional arrangement. These additional members cause an increase in diameter of the lens barrel.

BRIEF SUMMARY OF THE INVENTION

In view of the above problems in the examples of conventional arrangement, it is an object of the invention to provide a zoom lens barrel having such a multistage draw-out structure as three or more stages, with a simple driving mechanism without increasing the size of the lens barrel in the direction of its diameter and without lowering the strength of the lens barrel.

To attain the above object, in accordance with an aspect of the invention, there is provided a multistage draw-out zoom lens barrel, comprising, as intermediate members which are operated in association with a forefront tube moving in an optical axis direction and are contained in a fixed tubular member, a rotary member movable in the optical axis direction and a rectilinear member contained in the rotary member and movable in the optical axis direction, wherein the movement of the rotary member in the optical axis direction is caused by the movement of the rectilinear member in the optical axis direction.

Specifically, in accordance with another aspect of the invention, there is provided a zoom lens barrel, comprising a fixed tube provided at a camera body, a first rotary tube arranged to move in an optical axis direction relative to the fixed tube and rotate around the optical axis during zooming, the first rotary tube having a helical groove formed on an inner surface thereof, a first rectilinear member disposed inside the first rotary tube and arranged to rectilinearly move in the optical axis direction integrally with the first rotary tube, a second rotary tube disposed inside the first rotary tube and arranged to rotate in the same rotating direction as that of the first rotary tube in association with rotation of the first rotary tube, and a second rectilinear member disposed inside the second rotary tube, having a projecting part engaging the helical groove and prevented by the first rectilinear member from rotating around the optical axis, wherein the rotation of the first rotary tube causes the second rectilinear member to move in the optical axis direction according to a locus of the helical groove, thereby causing the second rotary tube to move in the optical axis direction.

In accordance with a further aspect of the invention, there is provided a zoom lens barrel, comprising a fixed tube provided at a camera body, a first rotary member arranged to move in an optical axis direction relative to the fixed tube and rotate around the optical axis during zooming, a first rectilinear tube disposed outside the first rotary member and arranged to rectilinearly move in the optical axis direction integrally with the first rotary member without rotating around the optical axis relative to the fixed tube, the first rectilinear tube having a helical groove formed on an inner surface thereof, a second rectilinear tube disposed inside the first rectilinear tube and arranged to rectilinearly move in the optical axis direction while being prevented by the first rectilinear tube from rotating, and a second rotary member disposed inside the second rectilinear tube, having a projecting part engaging the helical groove and arranged to rotate in the same direction as that of the rotation of the first rotary member, wherein the rotation of the second rotary member with the projecting part engaging the helical groove causes the second rectilinear tube to move in the optical axis direction.

In accordance with a further aspect of the invention, there is provided a zoom lens barrel, comprising a forefront tube movable in an optical axis direction and disposed in the forefront of the zoom lens barrel, a tubular member fixed to a camera body, and a plurality of intermediate members arranged to connect the tubular member and the forefront tube with each other, each of the plurality of intermediate members including a rotary member movable in the optical axis direction while rotating around the optical axis, and a rectilinear member movable in the optical axis direction without rotating around the optical axis, wherein, in each intermediate member corresponding to a second or further stage, counted from the tubular member toward the forefront tube, of the plurality of intermediate members, the rectilinear member is disposed nearer to the optical axis than the rotary member and is arranged to receive a driving force in the optical axis direction and cause the rotary member to move in the optical axis direction in a state of being rotatable relative to the rectilinear member.

In accordance with a further aspect of the invention, there is provided a zoom lens barrel, comprising a forefront tube movable in an optical axis direction and disposed in the forefront of the zoom lens barrel, a tubular member fixed to a camera body, and a plurality of intermediate members arranged to connect the tubular member and the forefront tube with each other, each of the plurality of intermediate members including a rotary member movable in the optical axis direction while rotating around the optical axis, and a rectilinear member movable in the optical axis direction without rotating around the optical axis, wherein, in each intermediate member corresponding to a second or further stage, counted from the tubular member toward the forefront tube, of the plurality of intermediate members, the rotary member is disposed nearer to the optical axis than the rectilinear member and is arranged to receive a driving force in the optical axis direction and cause the rectilinear member to move in the optical axis direction in a state of being rotatable relative to the rotary member.

In accordance with a further aspect of the invention, there is provided a zoom lens barrel, comprising a forefront tube movable in an optical axis direction without rotating around the optical axis and disposed in the forefront of the zoom lens barrel, a tubular member fixed to a camera body, and a plurality of intermediate members arranged to connect the tubular member and the forefront tube with each other, each of the plurality of intermediate members including a rotary member movable in the optical axis direction while rotating around the optical axis, and a rectilinear member movable in the optical axis direction without rotating around the optical axis, the rectilinear members including a first rectilinear member and a second rectilinear member, the first rectilinear member being arranged to prevent the second rectilinear member from rotating around the optical axis, the second rectilinear member being arranged to prevent the forefront tube from rotating around the optical axis, the rotary members including a moving rotary tube arranged to be movable in the optical axis direction together with the second rectilinear member while rotating around the optical axis and arranged to be capable of containing the forefront tube, wherein the second rectilinear member is disposed nearer to the optical axis than the moving rotary tube.

The above and further objects and features of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

A first embodiment of the invention is first described with reference to FIG. 1 and FIGS. 2A and 2B.

Figure 1:
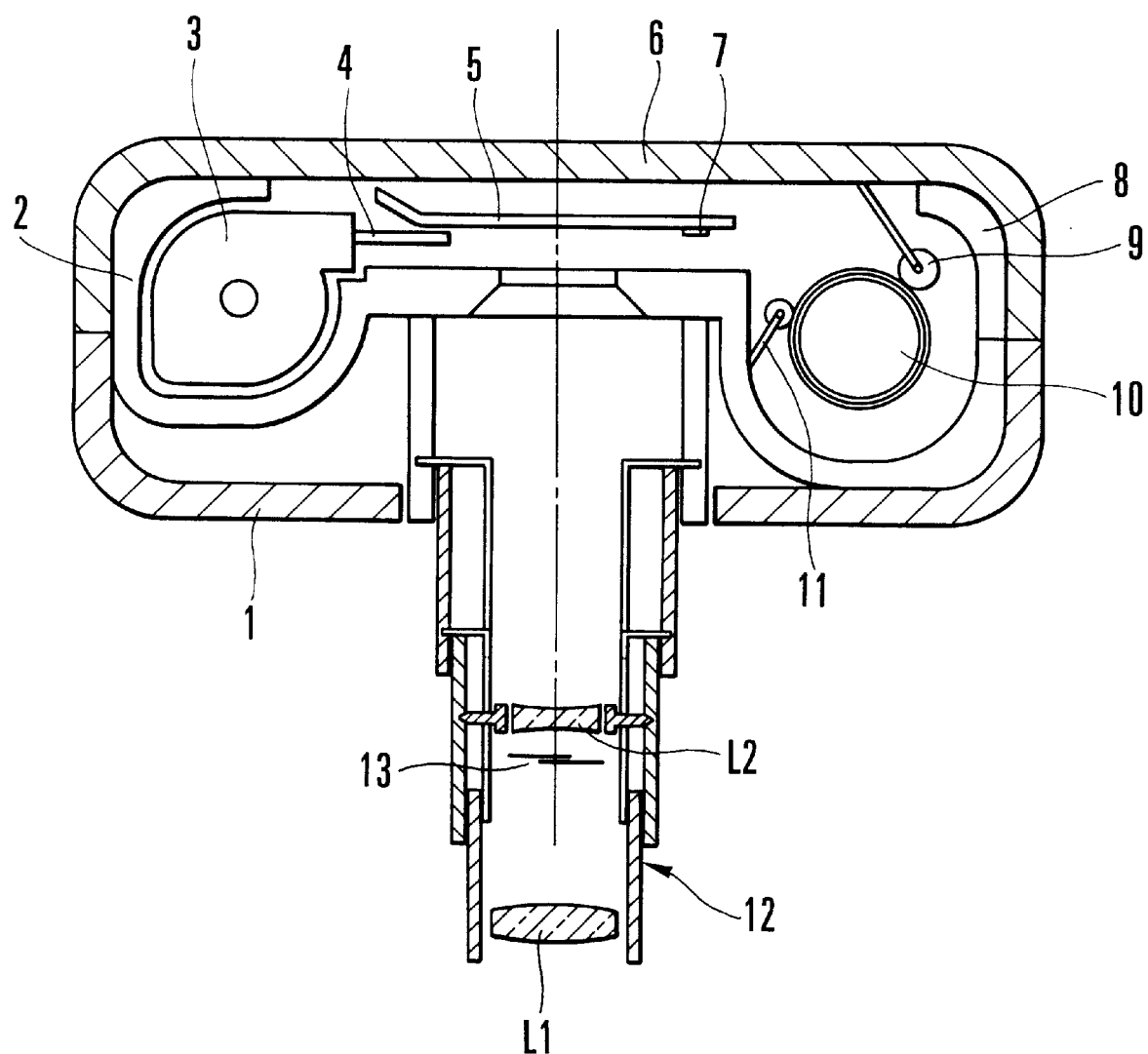
FIG. 1 is a sectional view showing in outline the arrangement of a compact camera having a zoom lens barrel according to a first embodiment of the invention when the zoom lens barrel is in its telephoto end position.

FIG. 1 is a sectional view showing a compact camera of the compact film cartridge type having a zoom lens barrel according to the first embodiment of the invention when the zoom lens barrel is in its telephoto end position.

Referring to FIG. 1, the camera of the compact film cartridge type in the first embodiment has a camera body formed with a front cover 1 and a rear cover 6. A film cartridge 3 is placed within a cartridge chamber 2. A photographic film 4 which is used as an image recording medium is transported from the film cartridge 3. A pressure plate 5 which is mounted on the inner side of the rear cover 6 of the camera body supports the film 4 moved out from the cartridge 3 at an image forming position where an image of light incident through lenses L1 and L2 and a shutter 13 disposed within a zoom lens barrel unit 12 is formed. After the film 4 is exposed to light at the image forming position, the film 4 is taken up on a spool 10 which is disposed within a spool chamber 8.

A back lid roller 9 which is secured to the rear cover 6 is elastically pushed against the spool 10. A body roller 11 which is secured to the camera body is also elastically pushed against the spool 10.

A magnetic head 7 is arranged on the pressure plate 5 to write magnetic information into the film 4 when the film 4 is taken up and wound and moved from the cartridge chamber 2 into the spool chamber 8 or rewound from the spool chamber 8 back to the cartridge chamber 2.

While the invention is applied to the camera of the compact film cartridge type, as a compact camera in the case of the first embodiment, the invention is of course applicable also to optical apparatuses of the kind having a zoom optical system, such as cameras using the conventional film, video cameras and so forth.

Figures 2A, 2B:
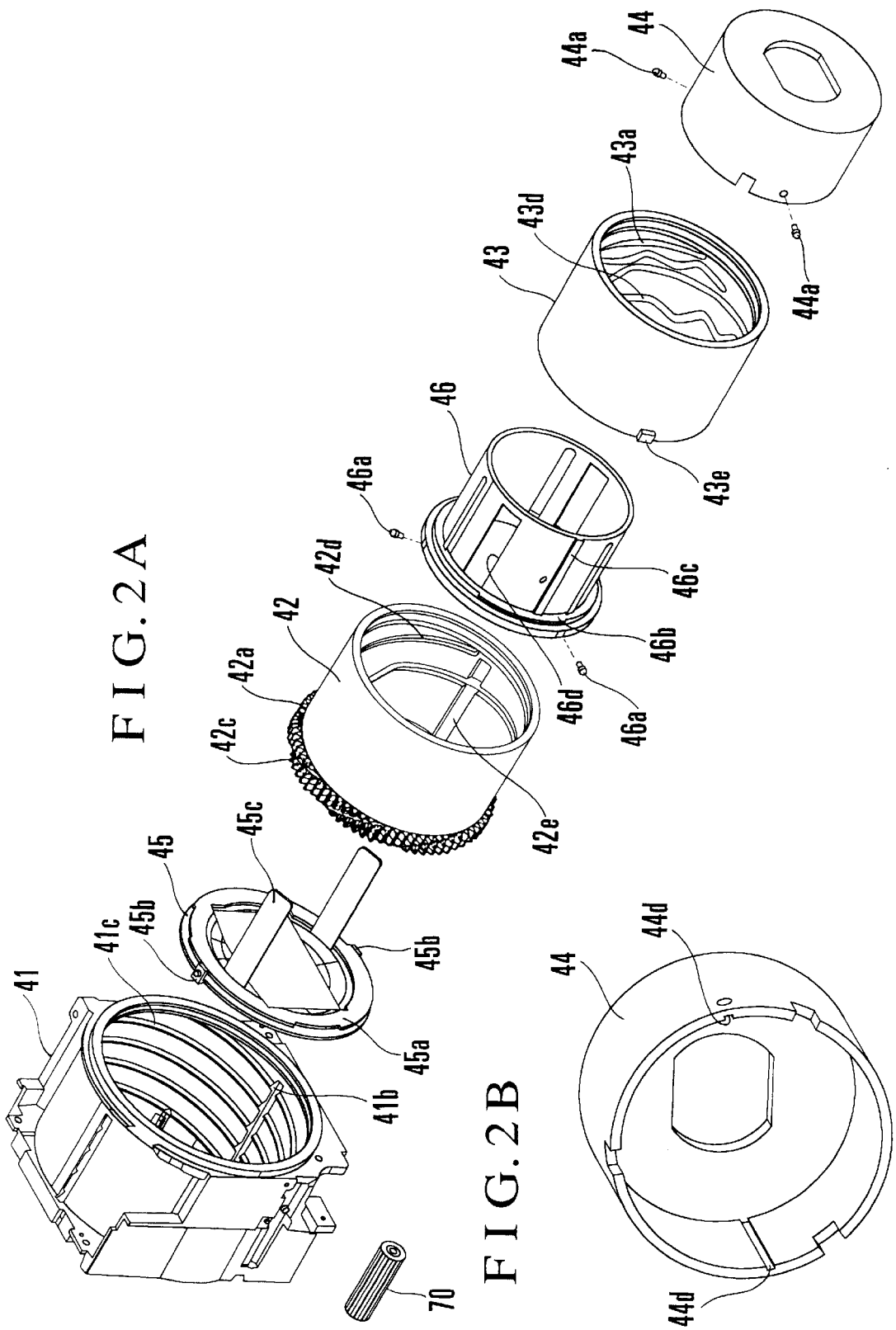
FIG. 2A is an exploded perspective view showing the zoom lens barrel according to the first embodiment shown in FIG. 1.
FIG. 2B is a perspective view of a rectilinear tube shown in FIG. 2A.

FIG. 2A is an exploded perspective view showing the the zoom lens barrel according to the first embodiment shown in FIG. 1.

Referring to FIG. 2A, a first rotary tube 42 is mounted inside a fixed tube 41, which is formed integrally with the camera body, and is arranged to be drawn out in the optical axis direction and rotate around the optical axis. On the outer circumference of the first rotary tube 42, there is formed a gear 42a. The gear 42a is meshed with a driving gear 70, which is long in the optical axis direction and is mounted on the camera body. Further, a male helicoid 42c is formed in the gear 42a of the first rotary tube 42. On the other hand, the fixed tube 41 has a female helicoid 41c formed on an inner surface thereof. The male helicoid 42c is fitted in the female helicoid 41c.

Accordingly, when the driving gear 70 is rotated by a motor disposed in the camera body, the first rotary tube 42 is rotated around the optical axis due to the meshing between the gear 70 and the gear 42a and is also moved in the optical direction due to the helicoid coupling. Incidentally, the driving gear 70 has a length corresponding to at least the stroke by which the first rotary tube 42 moves in the optical axis direction.

A first rectilinear member 45 is mounted inside the first rotary tube 42. The first rectilinear member 45 is provided with a locking part 45a, a plurality of projections 45b formed at intervals of a predetermined angle, and restricting parts 45c which are lengthwise in the optical axis direction. On the inner surface of the first rotary tube 42, there is formed a circumferential groove (not shown), in which the locking part 45a is fitted. Thus, the first rotary tube 42 is arranged to be rotatable relative to the first rectilinear member 45 with the locking part 45a fitted in the circumferential groove. Further, due to the fitting engagement between the locking part 45a and the circumferential groove, the first rotary tube 42 and the first rectilinear member 45 move together in the optical axis direction.

On the other hand, on the inner surface of the fixed tube 41, there are also formed a plurality of slots 41b, which are lengthwise in the optical axis direction and in which the projections 45b of the first rectilinear member 45 are respectively fitted, so that the first rectilinear member 45 is arranged to move only in the optical axis direction without rotating around the optical axis.

Accordingly, when the first rotary member 42 is rotated, the first rectilinear member 45 moves in the optical axis direction by the same amount of movement as that of the first rotary tube 42 without rotating, owing to the engagement between the projections 45b and the slots 41b.

A second rotary tube 43 is mounted inside the first rotary tube 42, and a second rectilinear member 46 is mounted inside the second rotary tube 43. Since the restricting parts 45c of the first rectilinear member 45 are fitted in slots 46d formed in the second rectilinear member 46, the second rectilinear member 46 moves only in the optical axis direction without rotating, similarly to the first rectilinear member 45.

The second rectilinear member 46 is provided with a locking part 46b. On the other hand, on the inner surface of the second rotary tube 43, there is formed a circumferential groove (not shown), in which the locking part 46b is fitted. Thus, the second rotary tube 43 is arranged to be rotatable relative to the second rectilinear member 46 along the circumferential groove. Further, due to the fitting engagement between the locking part 46a and the circumferential groove, the second rotary tube 43 and the second rectilinear member 46 move together in the optical axis direction.

In addition, a plurality of pins 46a are mounted on the rear end of the second rectilinear member 46. The plurality of pins 46a are fitted in helical grooves 42d formed on the inner surface of the first rotary tube 42.

Further, a plurality of projections 43e are formed on the rear end of the second rotary tube 43. The plurality of projections 43e are fitted in straight grooves 42e formed on the inner surface of the first rotary tube 42.

Accordingly, when the first rotary tube 42 is rotated, the second rotary tube 43 rotates integrally with the first rotary tube 42 due to the fitting engagement between the projections 43e and the straight grooves 42e. On the other hand, the second rectilinear member 46, while being prevented by the first rectilinear member 45 from rotating, moves only in the optical axis direction by receiving a driving force from the helical grooves 42d due to the fitting engagement between the plurality of pins 46a and the helical grooves 42d. In this instance, the second rotary tube 43 and the second rectilinear tube 46 move in the optical axis direction integrally with each other due to the engagement between the locking part 46b and the circumferential groove of the second rotary tube 43. In addition, on the inner surface of the second rotary tube 43, there are formed cam grooves 43d for moving the lens group L2.

A rectilinear tube 44 has the lens group L1 disposed therein. A plurality of pins 44a, which are mounted on the outer surface of the rectilinear tube 44, are fitted in helical grooves 43a formed on the inner surface of the second rotary tube 43. Referring to FIG. 2B, which is a perspective view of the rectilinear tube 44 as viewed from the back side thereof, straight grooves 44d are formed on the inner surface of the rectilinear tube 44. In the straight grooves 44d, there are fitted projecting parts 46c which are formed on the outer surface of the second rectilinear member 46.

With the zoom lens barrel constructed in the above-described manner, each of the first rectilinear member 45, the second rectilinear member 46 and the rectilinear tube 44 moves only in the optical axis direction while being prevented by the slots 41b of the fixed tube 41 from rotating around the optical axis. On the other hand, the first rotary tube 42 and the second rotary tube 43 are arranged to rotate, while moving in the optical axis direction together with the first rectilinear member 45 and the second rectilinear member 46, respectively. More specifically, the constituent elements of the zoom lens barrel are operated as follows.

When the driving gear 70 is rotated by the motor, the first rotary member 42 is caused to rotate around the optical axis and move in the optical axis direction due to the helicoid coupling (41c, 42c). The first rectilinear member 45 moves in the optical axis direction together with the first rotary tube 42 due to the engagement between the locking part 45a and the circumferential groove of the first rotary tube 42. In this instance, the first rectilinear member 45 is prevented by the slots 41b of the fixed tube 41 from rotating around the optical axis.

When the first rotary member 42 rotates around the optical axis and moves in the optical axis direction, the second rectilinear member 46 is caused to move in the optical axis direction due to the fitting engagement between the helical grooves 42d and the pins 46a, but is prevented from rotating, due to the engagement between the restricting parts 45c and the slots 46d.

On the other hand, while the second rectilinear member 46 and the second rotary tube 43 move in the optical axis direction together due to the engagement between the locking part 46b and the circumferential groove of the second rotary tube 43, in this instance, the second rotary tube 43 rotates together with the first rotary tube 42 due to the fitting engagement between the projections 43e and the straight grooves 42e of the first rotary tube 42.

When the second rotary tube 43 moves in the optical axis direction and rotates around the optical axis, the rectilinear tube 44 is caused to move in the optical axis direction due to the fitting engagement between the pins 44a and the helical grooves 43a, but is prevented from rotating, due to the engagement between the projecting parts 46c of the second rectilinear member 46 and the straight grooves 44d.

It is to be noted that, since the helical grooves in the first embodiment are not through-holes but have bottom surfaces, the strength of the lens barrel is prevented from being lowered, as compared with the conventional arrangement in which through-holes are provided in place of the helical grooves.

Figure 3:
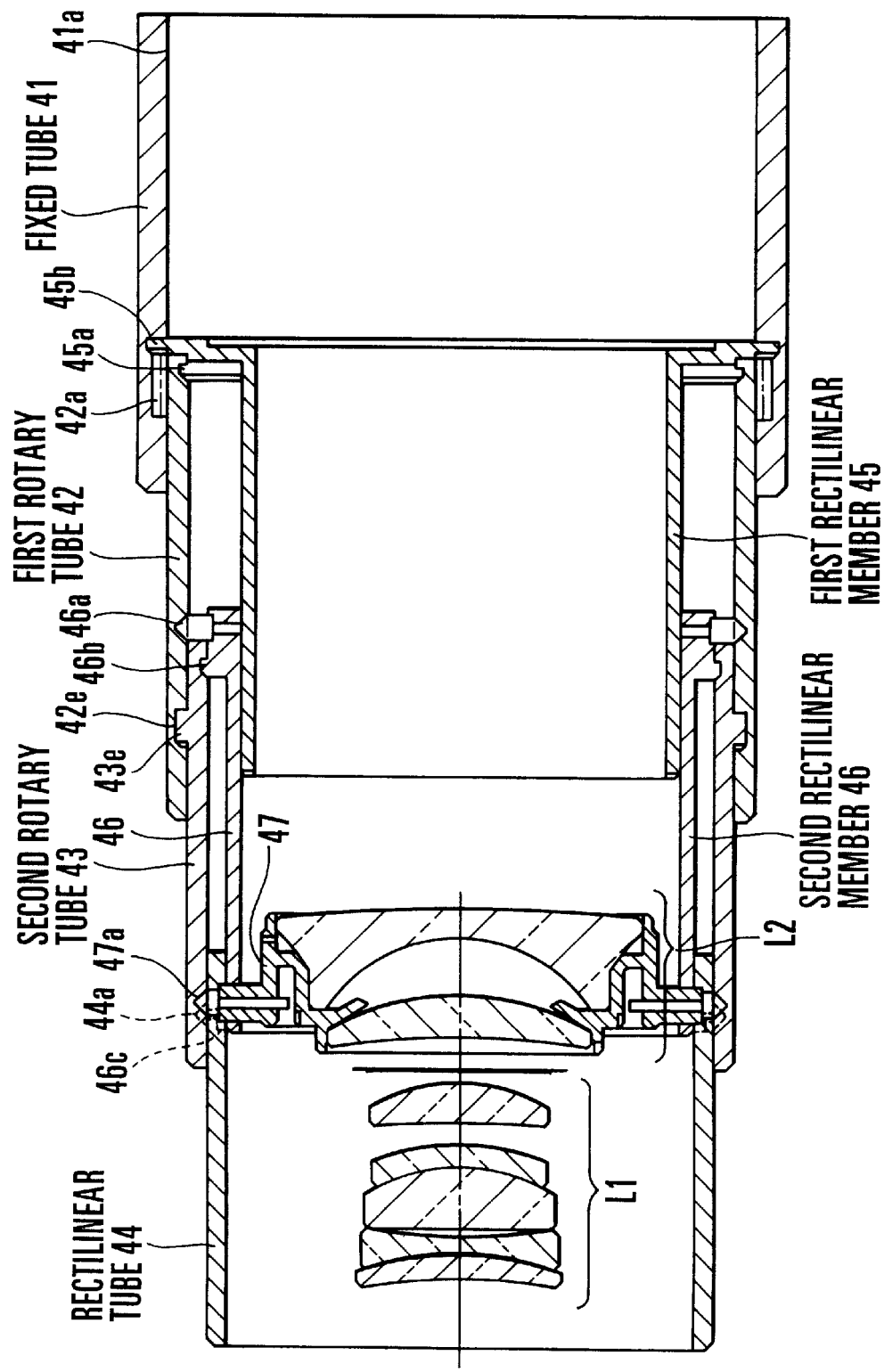
FIG. 3 is a sectional view showing the essential parts of a zoom lens barrel according to a second embodiment of the invention when the zoom lens barrel is in its telephoto end position.
Figure 4:
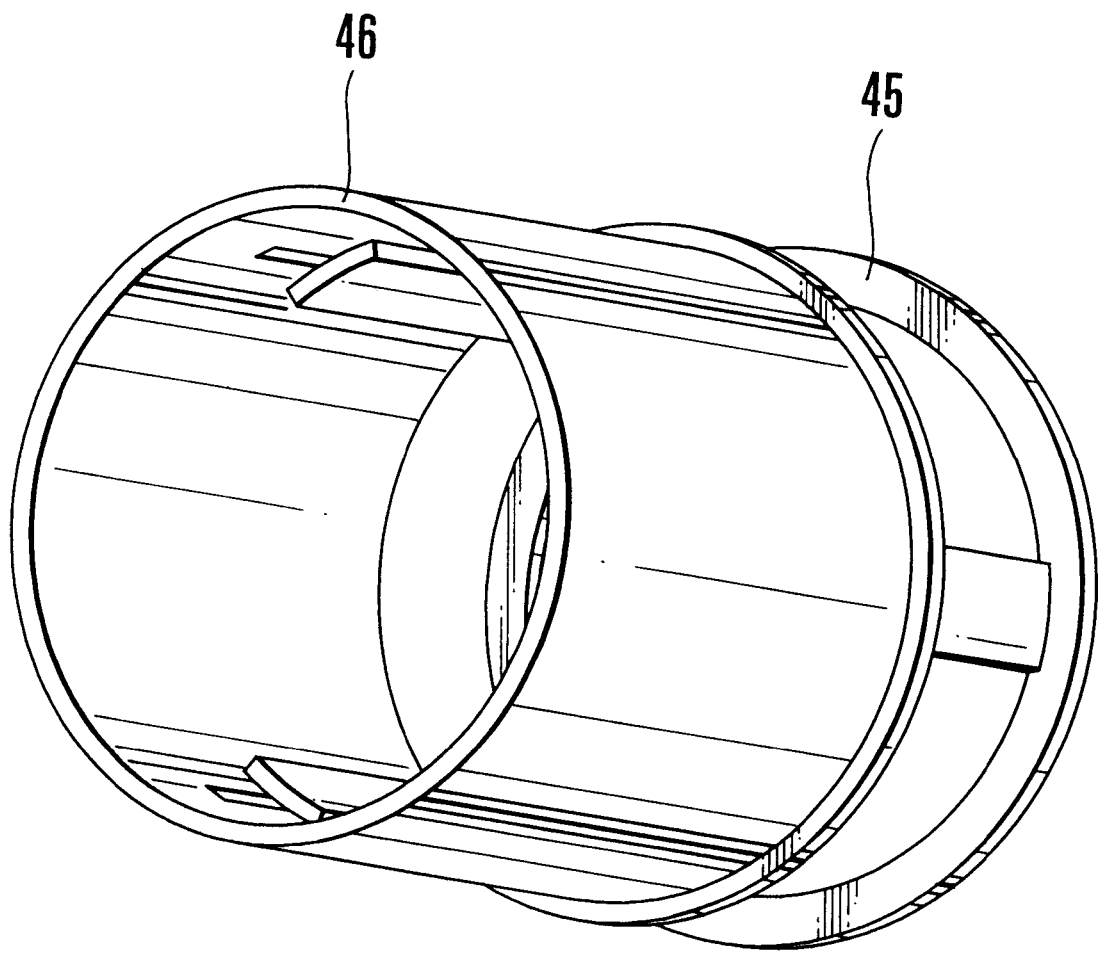
FIG. 4 is a perspective view showing in outline the arrangement of rectilinear members of the zoom lens barrel shown in FIG. 3.

FIGS. 3 and 4 relate to a zoom lens barrel according to a second embodiment of the invention. In FIGS. 3 and 4, members having the same functions as those of the members shown in FIG. 2A are denoted by the same reference numerals as in FIG. 2A. FIG. 3 shows the zoom lens barrel according to the second embodiment when in its telephoto end position. FIG. 4 is a perspective view showing the arrangement of rectilinear members of the zoom lens barrel.

In the case of the second embodiment, the lens barrel is of a three-stage draw-out structure composed of one fixed tube, two rotary tubes, one rectilinear tube and two rectilinear members.

The fixed tube 41 is secured to a camera body with a first rotary tube 42 disposed on the inner diameter side of the fixed tube 41. A gear 42a is formed on the outer surface of the first rotary tube 42 and is arranged to receive a rotative driving force from a drive source. With the driving force received, a male helicoid formed on the gear 42a which engages a female helicoid 41a formed on the inner (diameter) surface of the fixed tube 41 causes the first rotary tube 42 to rotate and move in the optical axis direction with respect to the fixed tube 41. A first rectilinear member 45 is mounted on the inner side of the first rotary tube 42 in such a way as to be rotatable relative to the first rotary tube 41 by means of a locking part 45a which is disposed on the rear end side of the first rotary tube 42. In addition to that, the first rectilinear member 45 is prevented from rotating by the engagement between slots formed on the inner surface of the fixed tube 41 and projections 45b provided on the first rectilinear member 45 and is thus arranged to move in the optical axis direction together with the first rotary tube 42 without rotating relative to the fixed tube 41.

A second rectilinear member 46 is interposed in between the first rotary tube 42 and the first rectilinear member 45. The second rectilinear member 46 is prevented from rotating by the first rectilinear member 45 and is arranged to move in the optical axis direction relative to the first rotary tube 42 due to the fitting engagement between pins 46a provided on the rear end of the second rectilinear member 46 and helical grooves formed on the inner surface of the first rotary tube 42. In this instance, the second rectilinear member 46 does not rotate relative to the fixed tube 41. The first rectilinear member 45 is disposed nearer to the optical axis than the second rectilinear member 46. In this case, the outer surface of the first rectilinear member 45 is located at a distance, from the optical axis, either shorter than or equal to the distance of the inner surface of the second rectilinear member 46.

The above-stated arrangement for having the first rectilinear member 45 located on the inner side of the second rectilinear member 46 tends to cause interference with a shutter mechanism, etc. However, such a trouble is avoidable by arranging the first rectilinear member 45 to have at least one of claw-like parts arranged as shown in FIG. 4.

Further, the prevention of rotation of the second rectilinear member 46 by the first rectilinear member 45 is attained by arranging a small projection or a linear projection at the outer fore end part of the first rectilinear member 45 to engage a straight groove formed on the inner surface of the second rectilinear member 46.

A second rotary tube 43 is interposed in between the first rotary tube 42 and the second rectilinear member 46. The second rotary tube 43 is arranged to receive, at its projections 43e, a driving force from the straight grooves 42e of the first rotary tube 42 and, thus, rotate at the same rotation angle with respect to the fixed tube 41 as the first rotary tube 42. Further, the second rotary tube 43 is arranged to move in the optical axis direction together with the second rectilinear member 46 while rotating with respect to the second rectilinear member 46 under a restriction imposed in the optical axis direction by a locking part 46b provided at the rear end of the second rectilinear member 46.

A rectilinear tube 44 is interposed in between the second rotary tube 43 and the second rectilinear member 46. The rectilinear member 44 is prevented from rotating by projections 46c provided at the fore end of the second rectilinear member 46. The rectilinear tube 44 is arranged to move in the optical axis direction relative to the second rotary tube 43 due to the engagement between pins 44a provided on the outer side of the rectilinear member 44 and helical grooves 43a provided on the inner surface of the second rotary tube 43 (see FIG. 2A). At this time, the rectilinear tube 44 does not rotate with respect to the fixed tube 41. Further, pins 47a provided on a lens holding frame 47 which holds a lens group L2 engage cam grooves 43d formed on the inner surface of the second rotary tube 43 to cause the lens group L2 to move (see FIG. 2A).

The lens barrel according to the second embodiment of the invention is arranged to be of a three-stage draw-out structure as described above. However, the arrangement of the second embodiment is of course applicable also to a draw-out structure of four stages or more.

Figure 5:
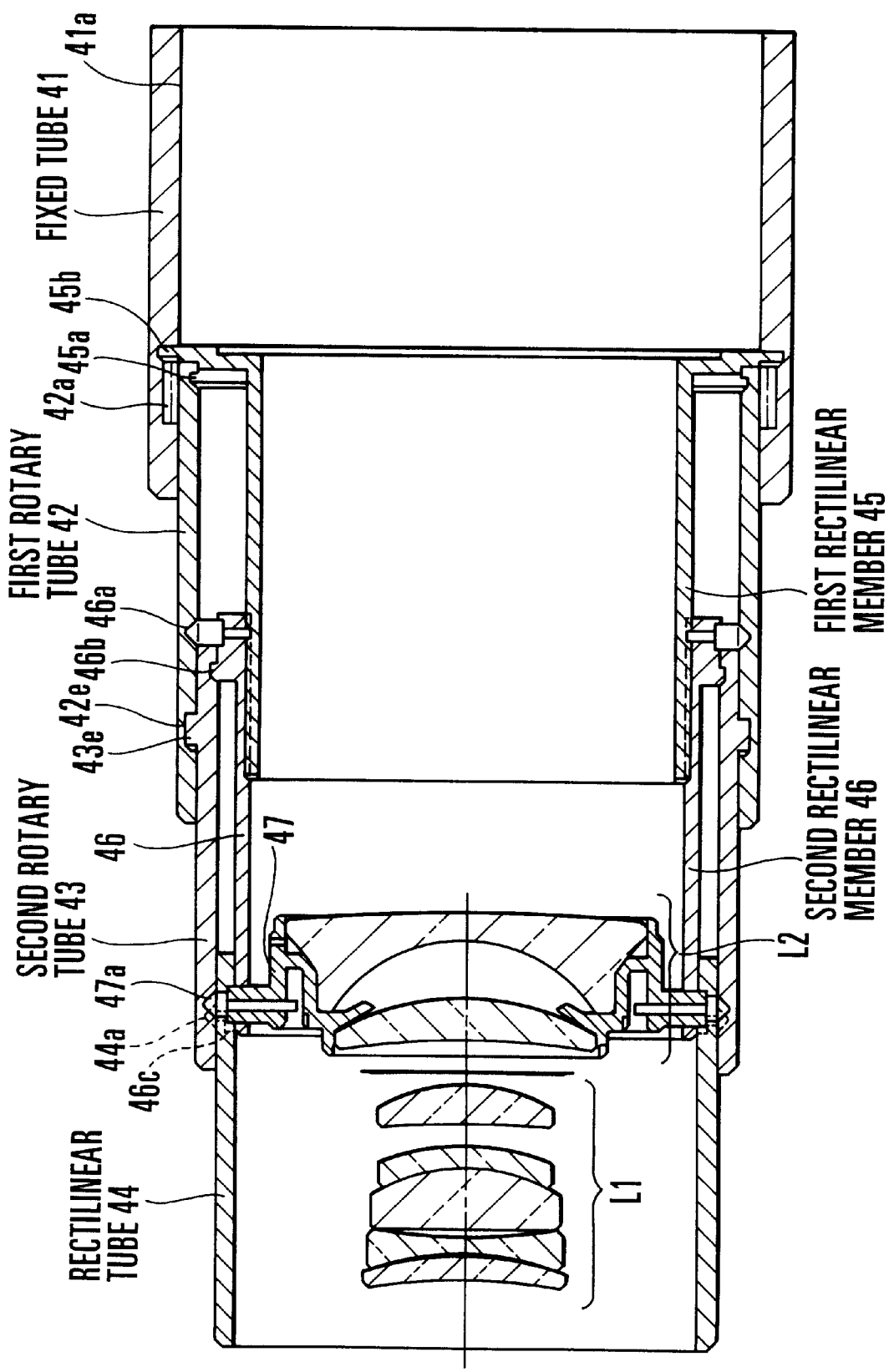
FIG. 5 is a sectional view showing the essential parts of a zoom lens barrel according to a first modification example of the second embodiment of the invention when the zoom lens barrel is in its telephoto end position.
Figure 6:
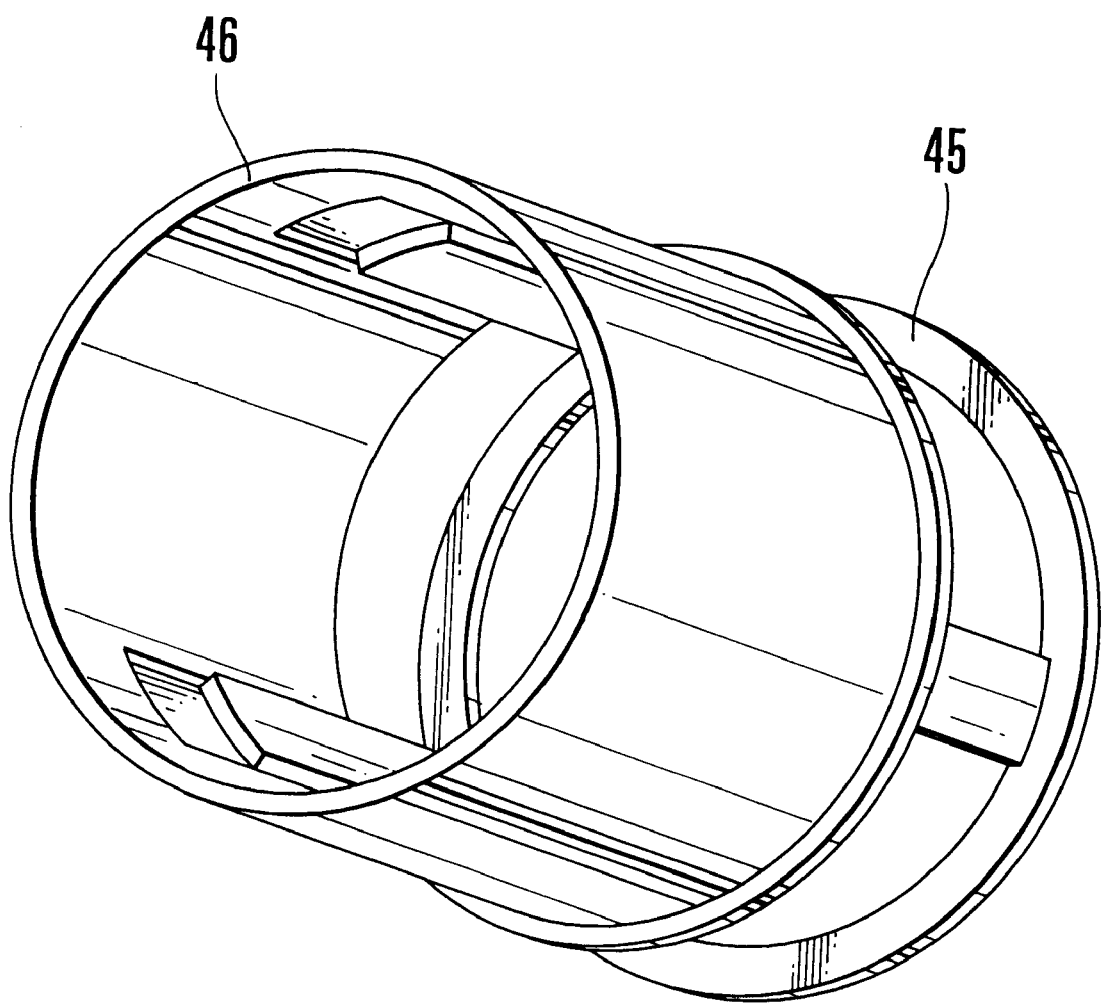
FIG. 6 is a perspective view showing in outline the arrangement of rectilinear members of the zoom lens barrel shown in FIG. 5.

FIGS. 5 and 6 show a first modification example of the second embodiment of the invention. To simplify description, all parts of the first modification example that are the same as those of the second embodiment are indicated by the same reference numerals as the second embodiment, and the following description covers only the difference of the first modification example from the second embodiment.

FIG. 5 is a sectional view showing a zoom lens barrel according to the first modification example of the second embodiment when the zoom lens barrel is in its telephoto end position. FIG. 6 is a perspective view showing the arrangement of rectilinear members shown in FIG. 5.

In the case of the first modification example of the second embodiment, the outside surface of the first rectilinear member 45 is located further outward than the inside surface of the second rectilinear member 46 (see FIG. 6).

The arrangement for having the first rectilinear member 45 disposed on the inner side tends to cause interference with a shutter mechanism, etc. However, such interference is avoidable by arranging the first rectilinear member 45 to be of a claw-like structure having at least one of claws as shown in FIG. 6. The prevention of rotation of the second rectilinear member 46 by the first rectilinear member 45 can be obtained by cutting out some part of the second rectilinear member 46 in such a way as to give some area where the first rectilinear member 45 can be allowed to fit into the second rectilinear member 46. Other parts of arrangement and actions of the first modification example of the second embodiment are the same as the second embodiment.

Figure 7:
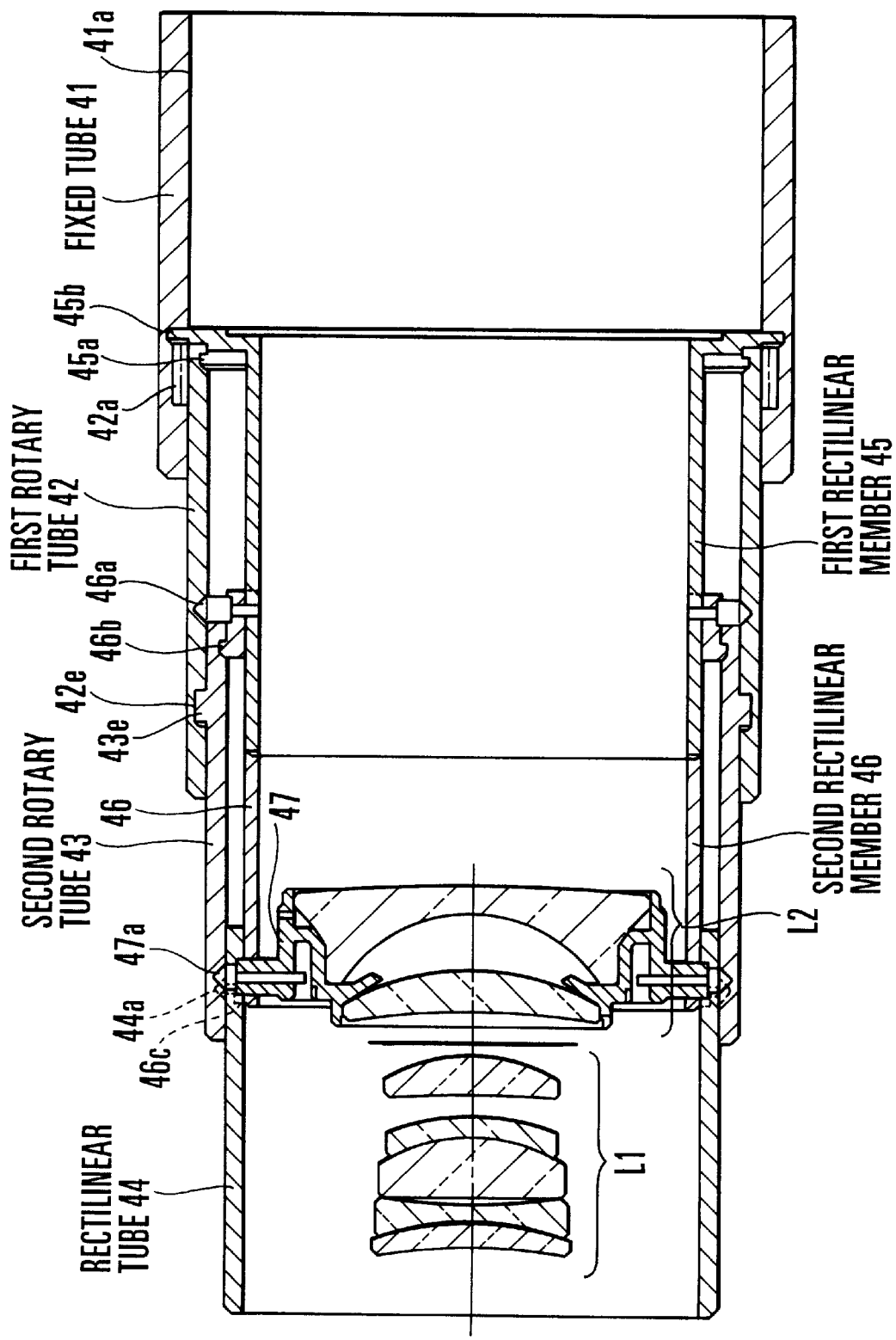
FIG. 7 is a sectional view showing the essential parts of a zoom lens barrel according to a second modification example of the second embodiment of the invention when the zoom lens barrel is in its telephoto end position.

FIG. 7 is a sectional view showing a zoom lens barrel according to a second modification example of the second embodiment of the invention when the zoom lens barrel is in its telephoto end position.

In the case of the second modification example of the second embodiment, the first rectilinear member 45 and the second rectilinear member 46 are fitted into each other to approximately form one and the same cylindrical shape as in the case of a first modification example of a fourth embodiment shown in FIG. 18, which will be described later. Other parts of arrangement and actions of the second modification example of the second embodiment are the same as the second embodiment.

Figure 8:
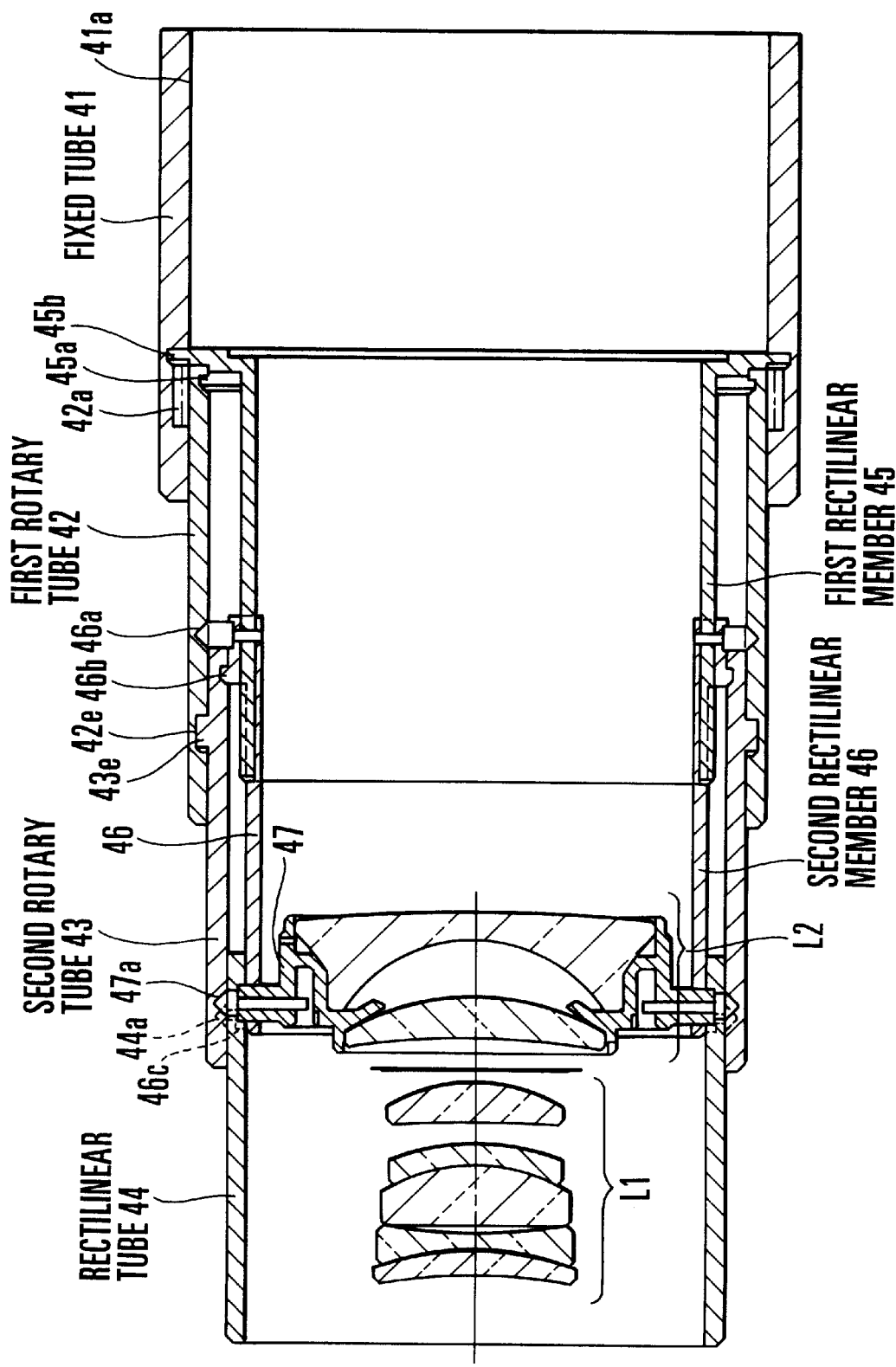
FIG. 8 is a sectional view showing the essential parts of a zoom lens barrel according to a third modification example of the second embodiment of the invention when the zoom lens barrel is in its telephoto end position.
Figure 9:
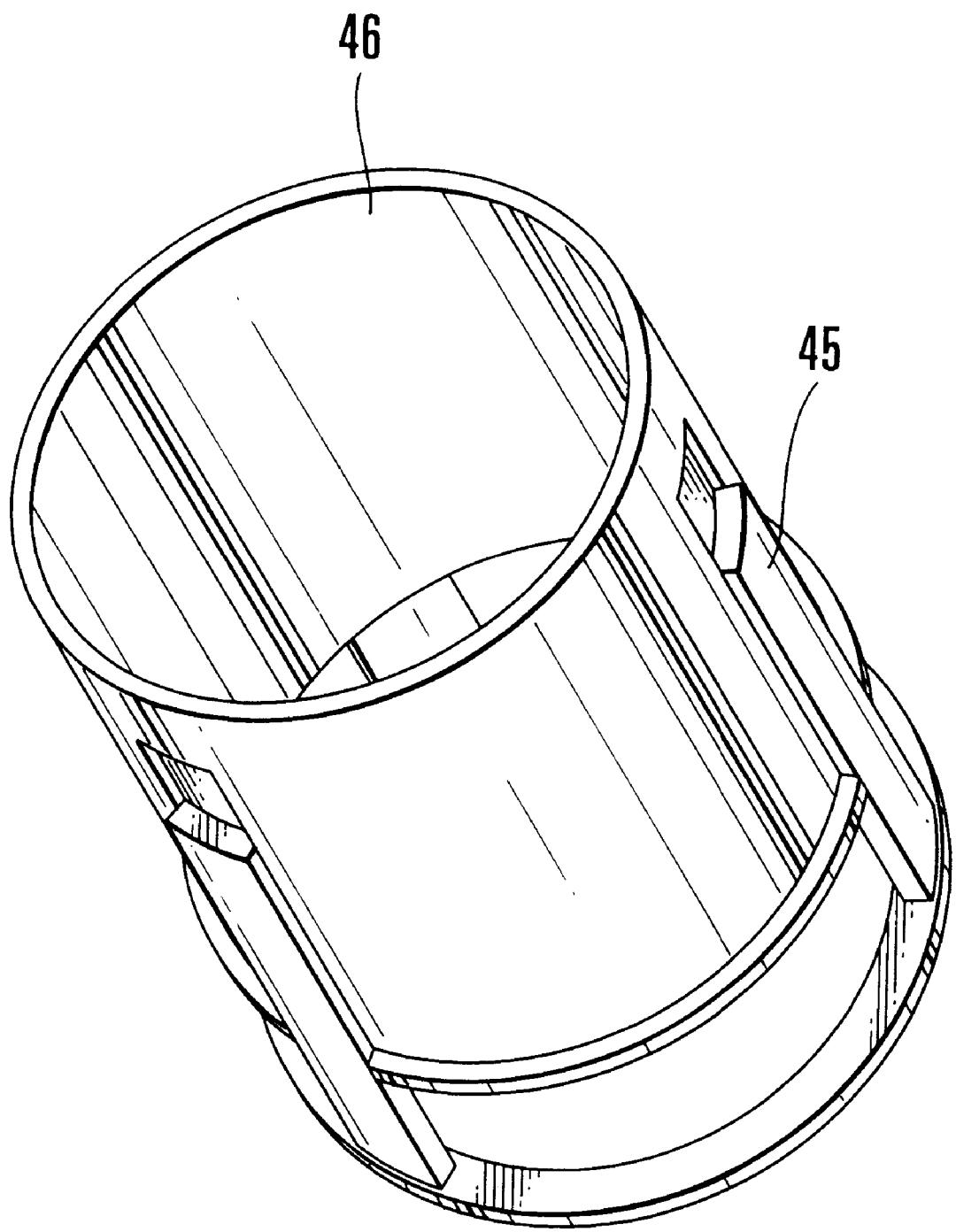
FIG. 9 is a perspective view showing in outline the arrangement of rectilinear members of the zoom lens barrel shown in FIG. 8.

FIGS. 8 and 9 relate to a zoom lens barrel according to a third modification example of the second embodiment. FIG. 8 is a sectional view showing the zoom lens barrel in its telephoto end position. FIG. 9 is a perspective view showing the arrangement of rectilinear members shown in FIG. 8.

In the third modification example of the second embodiment, the outside surface of the first rectilinear member 45 is located more inward than the outside surface of the rectilinear tube 44 and is located more outward than the outside surface of the second rectilinear member 46. The inside surface of the first rectilinear member 45 is located more inward than the outside surface of the second rectilinear member 46.

Further, as shown in FIG. 9, the end side of the first rectilinear member 46 is arranged to be in a claw-like shape having at least one claw part, while corresponding parts of the second rectilinear member 46 and the rectilinear tube 44 are cut out to give fitting-in areas to allow the first rectilinear member 45 to fit into these areas. Other parts of arrangement and actions of the third modification example of the second embodiment are the same as those of the second embodiment.

Figure 10:
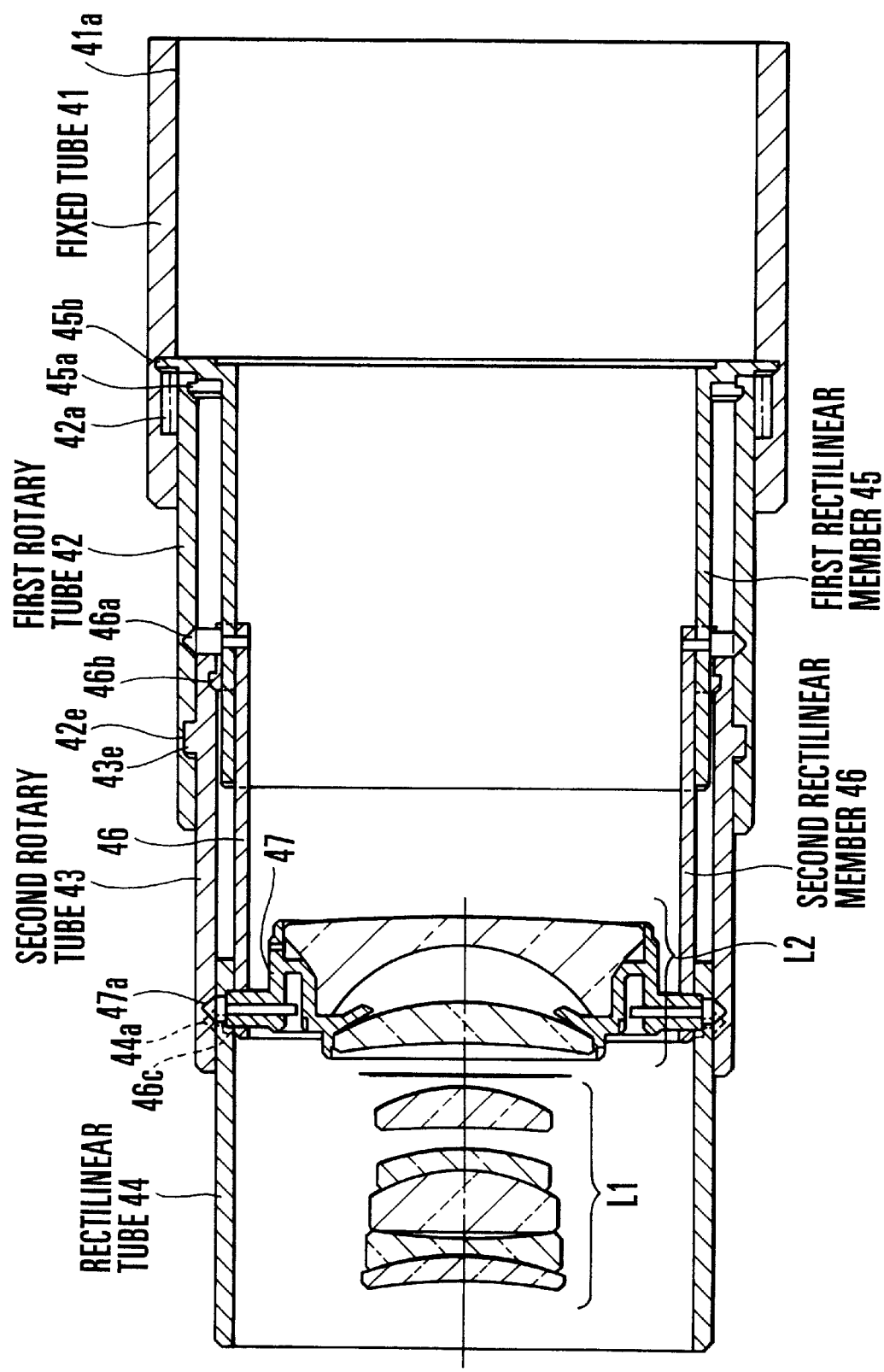
FIG. 10 is a sectional view showing the essential parts of a zoom lens barrel according to a fourth modification example of the second embodiment of the invention when the zoom lens barrel is in its 7 telephoto end position.

FIG. 10 is a sectional view showing a zoom lens barrel according to a fourth modification example of the second embodiment of the invention when the zoom lens barrel is in its telephoto end position.

In the fourth modification example of the second embodiment, the outside surface of the first rectilinear member 45 is located nearer to the optical axis than the outside surface of the rectilinear tube 44. The inside surface of the first rectilinear member 45 is arranged to be located at a distance from the optical axis which is either farther than or equal to the place where the outside surface of the second rectilinear member 46 is located.

The prevention of rotation of the second rectilinear member 46 by the first rectilinear member 45 can be obtained by providing a linear groove on the outer side of the second rectilinear member 46 and a small projection or a linear projection at the fore end on the inner side of the first rectilinear member 45 and arranging the projection to engage the linear groove. Other parts of arrangement and actions of the fourth modification example of the second embodiment are the same as the second embodiment.

While each of the above modification examples is of a three-stage draw-out lens barrel structure, the disclosed arrangement is of course applicable also to a lens barrel structure having four draw-out stages or more.

Figure 11:
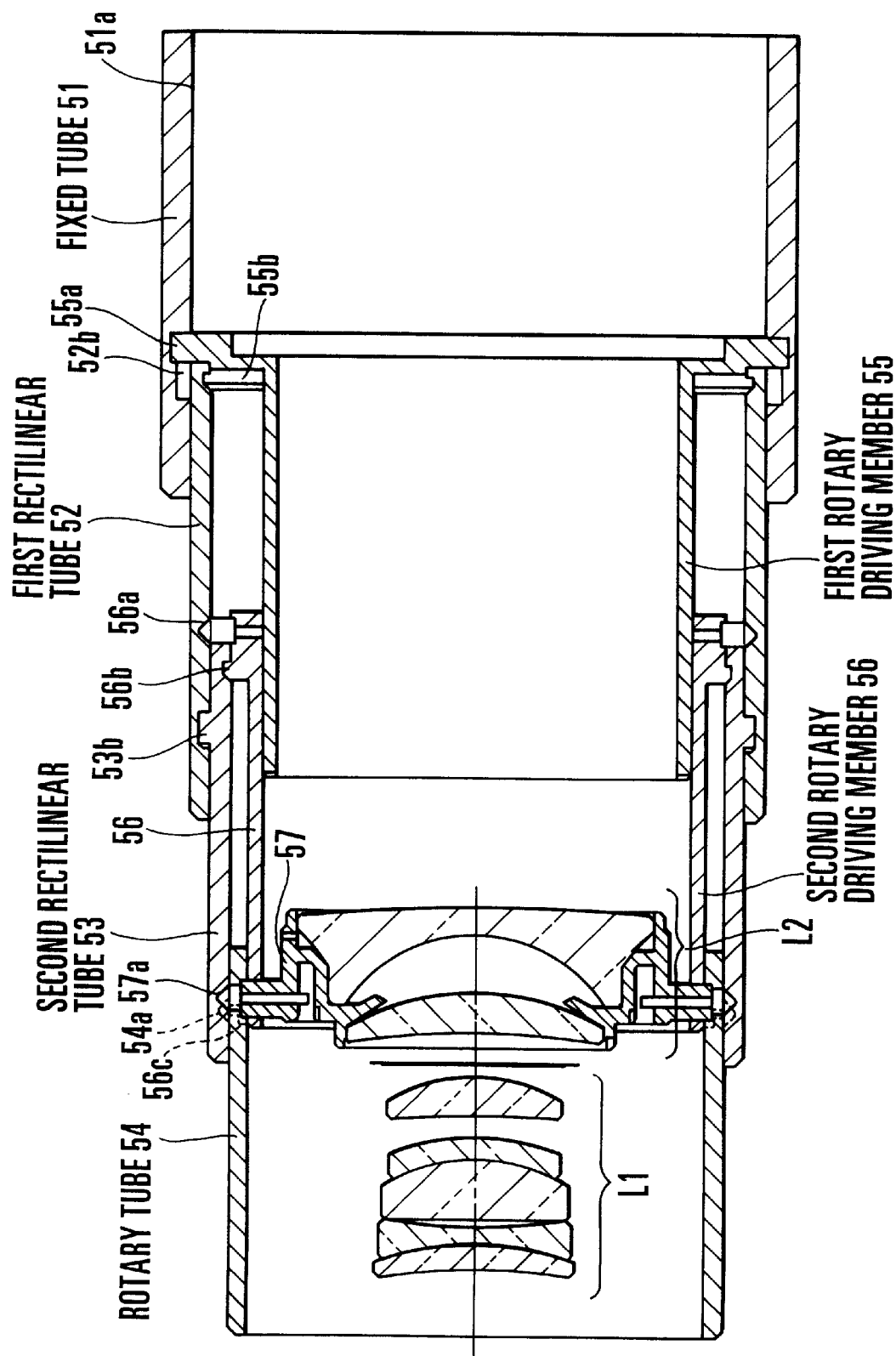
FIG. 11 is a sectional view showing the essential parts of a zoom lens barrel according to a third embodiment of the invention when the zoom lens barrel is in its telephoto end position.

FIG. 11 is a sectional view showing a zoom lens barrel according to a third embodiment of the invention when the zoom lens barrel is in its telephoto end position. It is to be noted that the construction of the third embodiment is obtained by conversely arranging the rotary tubes (42, 43) and the rectilinear members (45, 46) described above.

In the case of the third embodiment, the zoom lens barrel is of a three-stage draw-out structure which is composed of one fixed tube, two rectilinear tubes, one rotary tube and two rotary driving members.

Specifically, a fixed tube 51 is secured to a camera body with a first rectilinear tube 52 disposed on the inner diameter side of the fixed tube 51. A first rotary driving member 55 is disposed on the inner side of the first rectilinear tube 52. A gear 55*a* is formed on the outer side of the first rotary driving member 55, which is thus arranged to receive a rotative driving force from a drive source. With the driving force received, the engagement of a male helicoid formed on the gear 55*a* with a female helicoid 51*a* formed on the inner (diameter) side of the fixed tube 51 causes the first rotary driving member 55 to rotate and move in the optical axis direction with respect to the fixed tube 51. The first rectilinear tube 52 is mounted on the rear end side of the first rotary driving member 55 in such a way as to be rotatable relative to the first rotary driving member 55 by means of a locking part 55*b* which is disposed at the rear end of the first rotary driving member 55. In addition to that, the first rectilinear tube 52 is prevented from rotating by projections 52*b* which engage straight grooves provided on the inner surface of the fixed tube, and is arranged to move in the optical axis direction together with the first rotary driving member 55 without rotating relative to the fixed tube 51.

A second rectilinear tube 53 is interposed in between the first rectilinear tube 52 and the first rotary driving member 55. A second rotary driving member 56 is disposed on the inner side of the second rectilinear tube 53. The second rotary driving member 56 is driven to rotate by the first rotary driving member 55. Further, the second rotary driving member 56 is arranged to move in the optical axis direction relative to the first rectilinear tube 52 due to the fitting engagement between pins 56*a* provided on the rear end of the second rotary driving member 56 and helical grooves formed on the inner surface of the first rectilinear tube 52. The first rotary driving member 55 is disposed nearer to the optical axis than the second rotary driving member 56. In this case, the outer surface of the first rotary driving member 55 is located at a distance, from the optical axis, either shorter than or equal to the inner surface of the second rotary driving member 56.

The above-stated arrangement for having the first rotary driving member 55 located on the inner side of the second rotary driving member 56 tends to cause interference with a shutter mechanism, etc. This trouble is avoidable by arranging the first rotary driving member 55 to have at least one of claw-like parts arranged as shown in FIG. 4 in the second embodiment.

Further, the second rotary driving member 56 is arranged to be driven to rotate by the first rotary driving member 55 by forming a straight groove (not shown) on the inner side of the second rotary driving member 56 and a small projection at the outer fore end part or a linear projection on the outer surface of the first rotary driving member 55 and having them engage each other.

The second rectilinear tube 53 is prevented from rotating by the first rectilinear tube 52 by means of projections 53*b* and, therefore, does not rotate with respect to the fixed tube 51. Further, the second rectilinear tube 53 has its motion in the optical axis direction restricted by a locking part 56*b* provided at the rear end of the second rotary driving member 56. The second rectilinear tube 53 is thus arranged to move in the optical axis direction while relatively rotating with respect to the second rotary driving member 56.

A rotary tube 54 is interposed in between the second rectilinear tube 53 and the second rotary driving member 56. The rotary tube 54 is driven to rotate by receiving a driving force from projections 56*c* provided on the fore end part of the second rotary driving member 56 and is arranged to move in the optical axis direction relative to the second rectilinear tube 53 due to the engaging relation between pins 54*a* provided on the outer side of the rotary tube 54 and the second rectilinear tube 53. At this time, the rotary tube 54 rotates relative to the fixed tube 51. Further, pins 57*a* provided on a lens holding frame 57 which holds a lens group L2 engage the second rectilinear tube 53 to cause the lens group L2 to move.

While the third embodiment described above is of a three-stage lens barrel structure, the arrangement is of course applicable also to a lens barrel structure having four draw-out stages or more.

Figure 12:
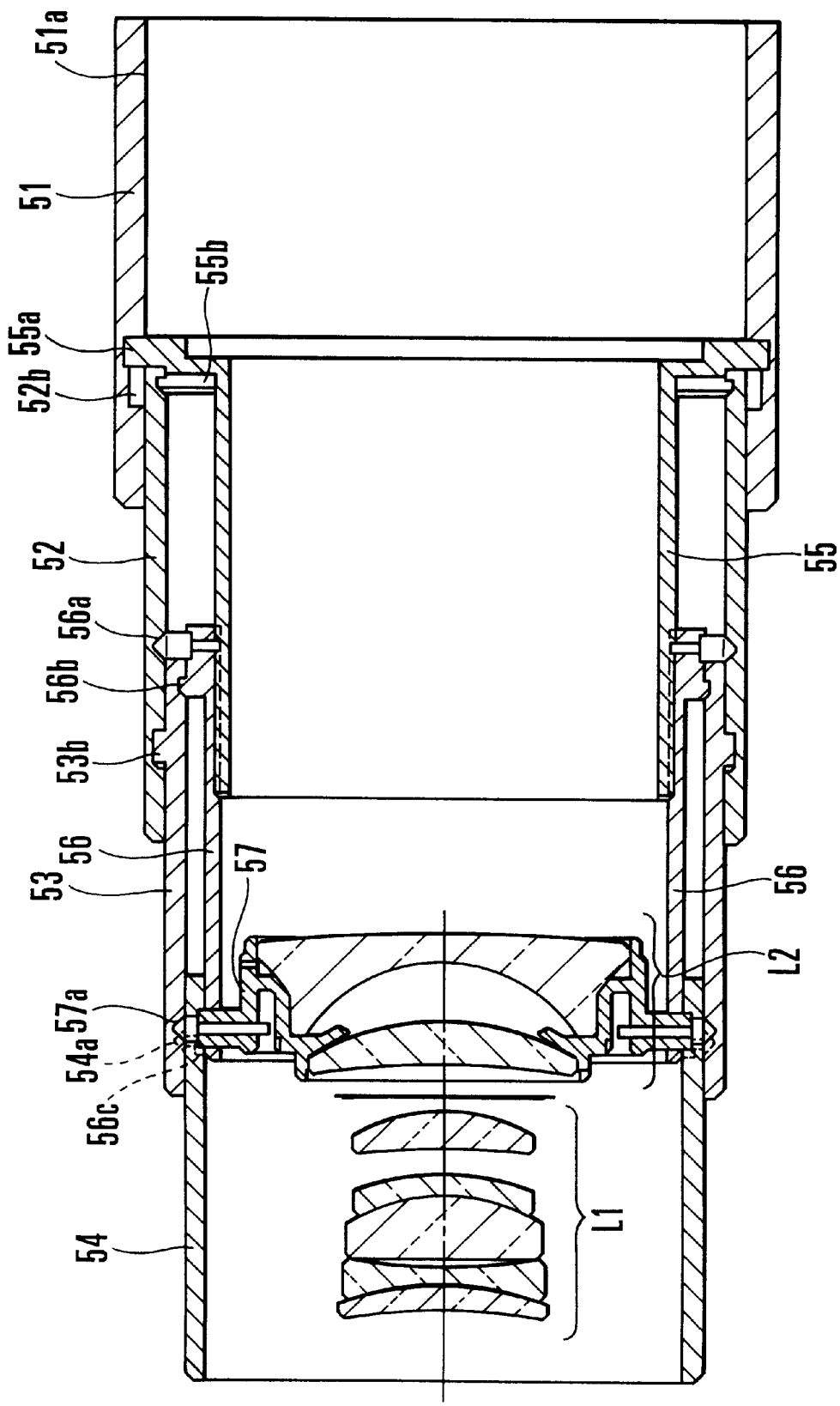
FIG. 12 is a sectional view showing the essential parts of a zoom lens barrel according to a first modification example of the third embodiment of the invention when the zoom lens barrel is in its telephoto end position.

FIG. 12 relates to a first modification example of the third embodiment of the invention. To simplify the description, all parts that are the same as those of the third embodiment are indicated by the same reference numerals, and the following description is limited to the difference of the first modification example from the third embodiment.

FIG. 12 is a sectional view showing a zoom lens barrel according to the first modification example of the third embodiment when the zoom lens barrel is in its telephoto end position.

In the first modification example of the third embodiment, the outside surface of the first rotary driving member 55 is located more outward than the inside surface of the second rotary driving member 56.

The arrangement for having the first rotary driving member 55 located on the inner side of the second rotary driving member 56 tends to cause interference with a shutter mechanism, etc. However, such a trouble is avoidable by arranging the first rotary driving member 55 to have at least one of claw-like parts arranged as shown in FIG. 6 in the first modification example of the second embodiment. Further, the second rotary driving member 56 is arranged to be driven to rotate by the first rotary driving member 55 by cutting out an area in the second rotary driving member 56 in such a shape as to allow the first rotary driving member 55 to fit into the second rotary driving member 56. Other parts of arrangement and actions of the first modification example of the third embodiment are the same as the third embodiment.

Figure 13:
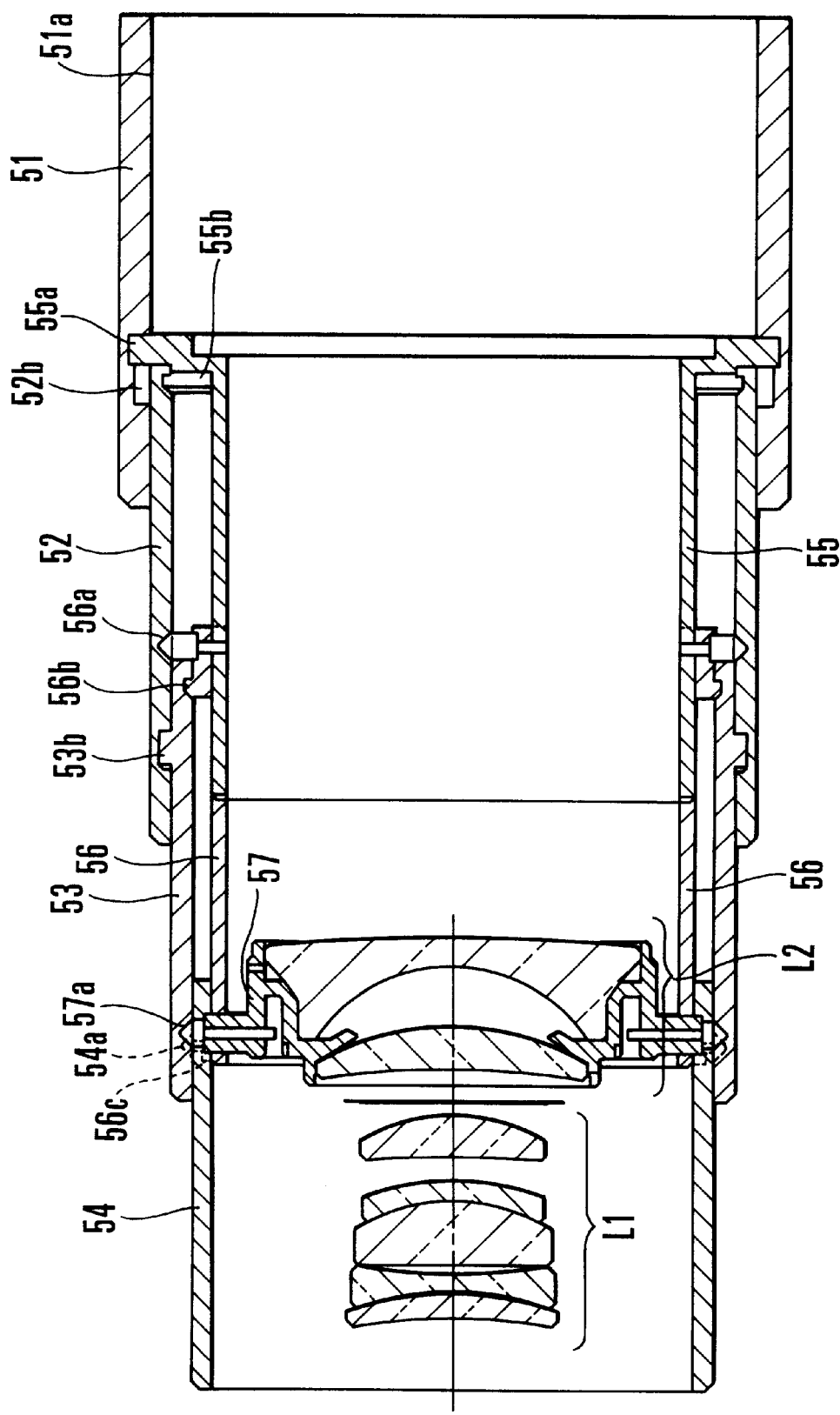
FIG. 13 is a sectional view showing the essential parts of a zoom lens barrel according to a second modification example of the third embodiment of the invention when the zoom lens barrel is in its telephoto end position.

FIG. 13 is a sectional view showing a zoom lens barrel according to a second modification example of the third embodiment when the zoom lens barrel is in its telephoto end position.

Figure 18:
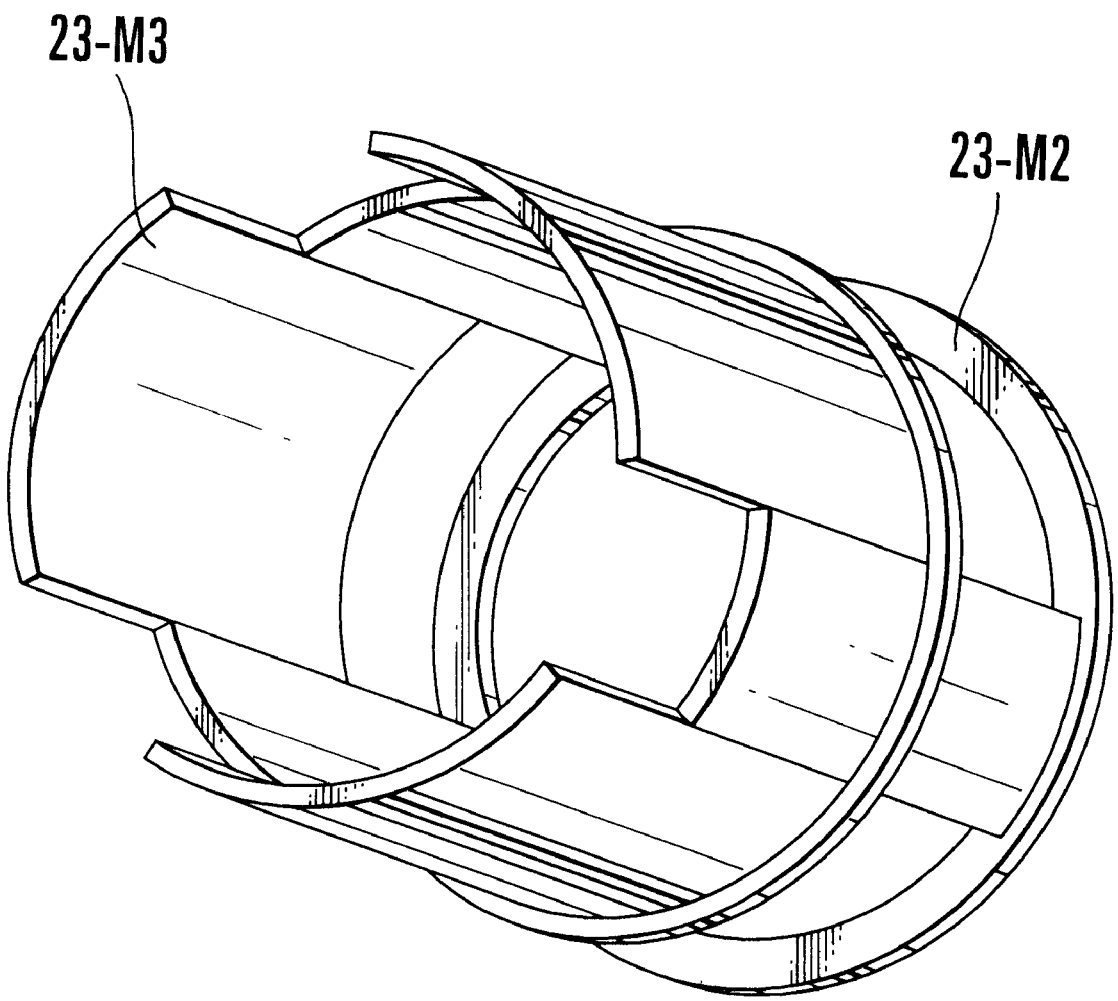
FIG. 18 is a perspective view showing in outline the arrangement of rectilinear members of the zoom lens barrel shown in FIG. 17.

In the second modification example of the third embodiment, the first rotary driving member 55 and the second rotary driving member 56 are arranged to fit into each other to form approximately one and the same cylindrical shape, as shown in FIG. 18 in a first modification example of the fourth embodiment, which will be described later. With the exception of this point, the arrangement and actions of the second modification example of the third embodiment are the same as the third embodiment.

Figure 14:
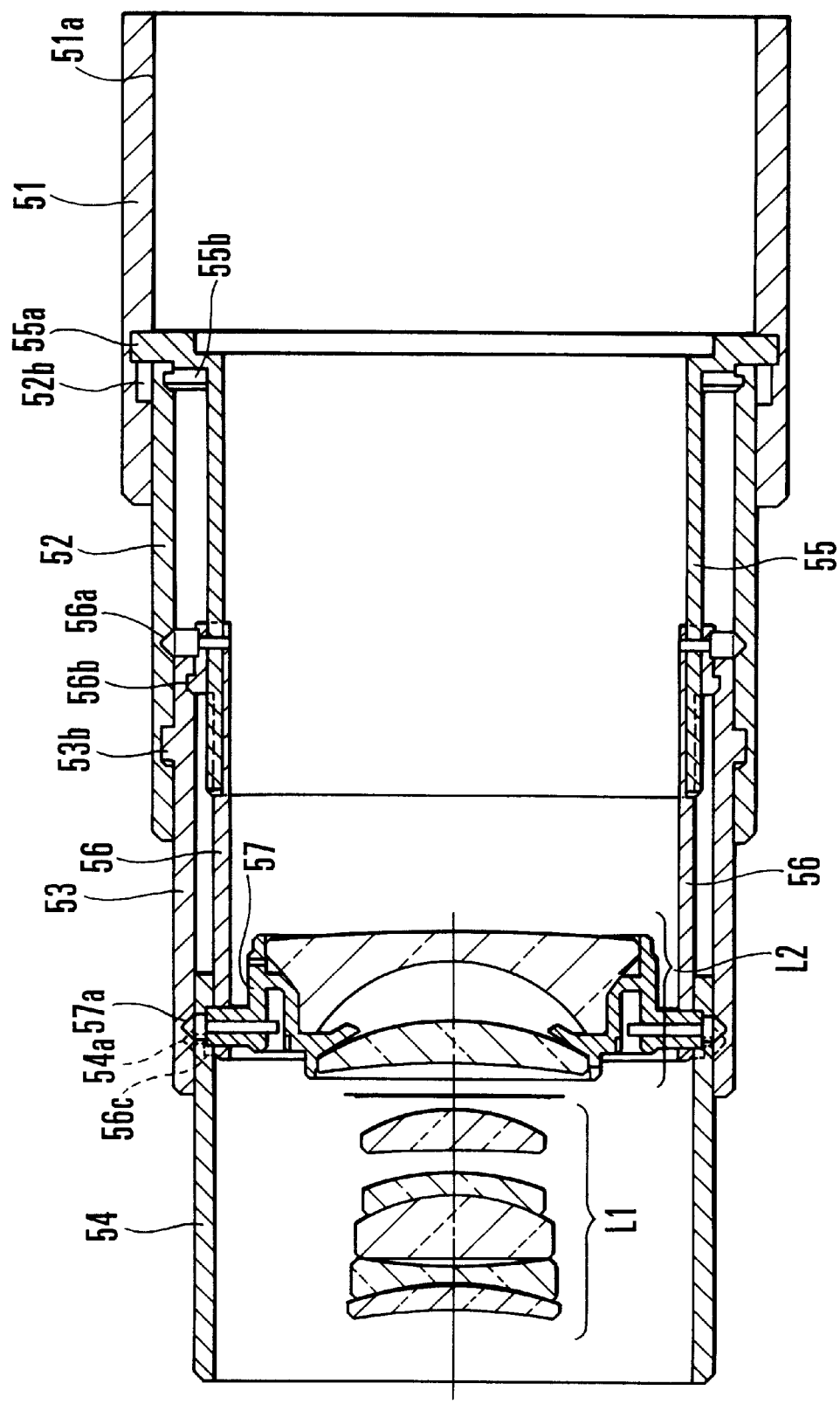
FIG. 14 is a sectional view showing the essential parts of a zoom lens barrel according to a third modification example of the third embodiment of the invention when the zoom lens barrel is in its telephoto end position.

FIG. 14 is a sectional view showing a zoom lens barrel according to a third modification example of the third embodiment when the zoom lens barrel is in its telephoto end position.

In the case of the third modification example of the third embodiment, the outside surface of the first rotary driving member 55 is located more inward than the outside surface of the rotary tube 54 and is located more outward than the outside surface of the second rotary driving member 56. The inside surface of the first rotary driving member 55 is located more inward than the outside surface of the second rotary driving member 56.

One end side of the first rotary driving member 55 is formed to have at least one claw-like part as shown in FIG. 9 in the third modification example of the second embodiment, and the second rotary driving member 56 and the rotary tube 54 have some cutout areas formed in such shapes as to allow the claw-like part of the first rotary driving member 55 to fit therein. With the exception of this, the third modification example of the third embodiment is arranged and acts in the same manner as the third embodiment.

Figure 15:
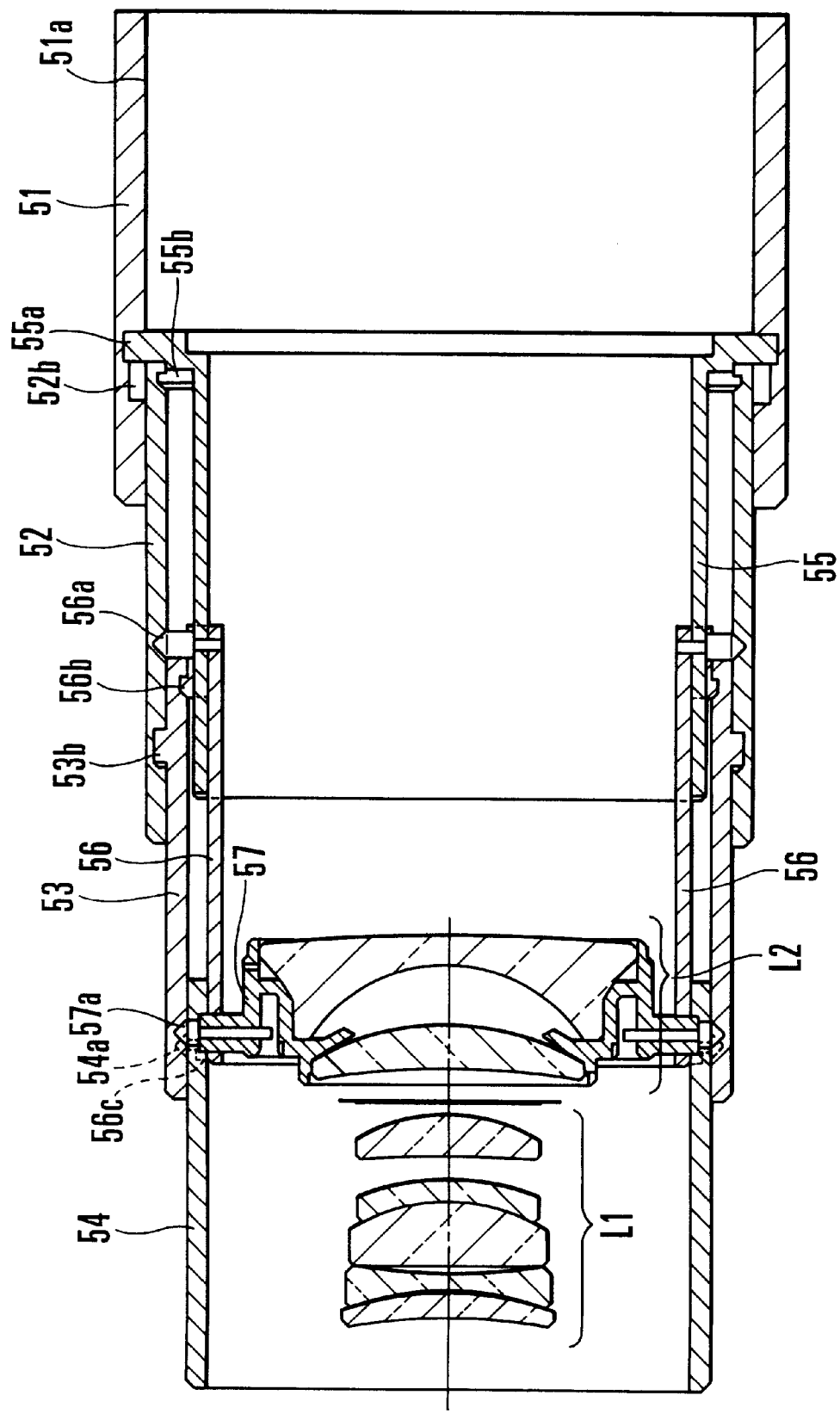
FIG. 15 is a sectional view showing the essential parts of a zoom lens barrel according to a fourth modification example of the third embodiment of the invention when the zoom lens barrel is in its telephoto end position.

FIG. 15 is a sectional view showing a zoom lens barrel according to a fourth modification example of the third embodiment when the zoom lens barrel is in its telephoto end position.

In the fourth modification example of the third embodiment, the outside surface of the first rotary driving member 55 is located more inward than the outside surface of the rotary tube 54. The inside surface of the first rotary driving member 55 is located at a distance from the optical axis which is either longer than or equal to the distance of the outside surface of the second rotary driving member 56. One end side of the first rotary driving member 55 is formed to have at least one claw-like part, while the rotary tube 54 has some cutout area formed in such a shape as to allow the claw-like part of the first rotary driving member 55 to fit therein.

Further, the second rotary driving member 56 is arranged to be driven to rotate by the first rotary driving member 55 by forming a straight groove (not shown) on the outer side of the second rotary driving member 56 and a small projection or a linear projection at the inside fore end part of the first rotary driving member 55 and having them engage each other. Other parts of arrangement and actions of the fourth modification example of the third embodiment are the same as the third embodiment.

Each of the modification examples of the third embodiment described above is of a three-stage draw-out lens barrel structure. However, the arrangement is of course applicable also to a lens barrel structure having four draw-out stages or more.

Next, the structural arrangement of a zoom lens barrel having such a multistage structure as three or more stages according to a fourth embodiment of the invention is described in detail with reference to FIG. 16.

The zoom lens barrel according to the fourth embodiment is of an n-stage draw-out structure, wherein "n" is equal to or more than three. The zoom lens barrel is composed of one fixed tube, n–1 rotary tubes, one forefront tube and n–1 rectilinear members.

Figure 16:
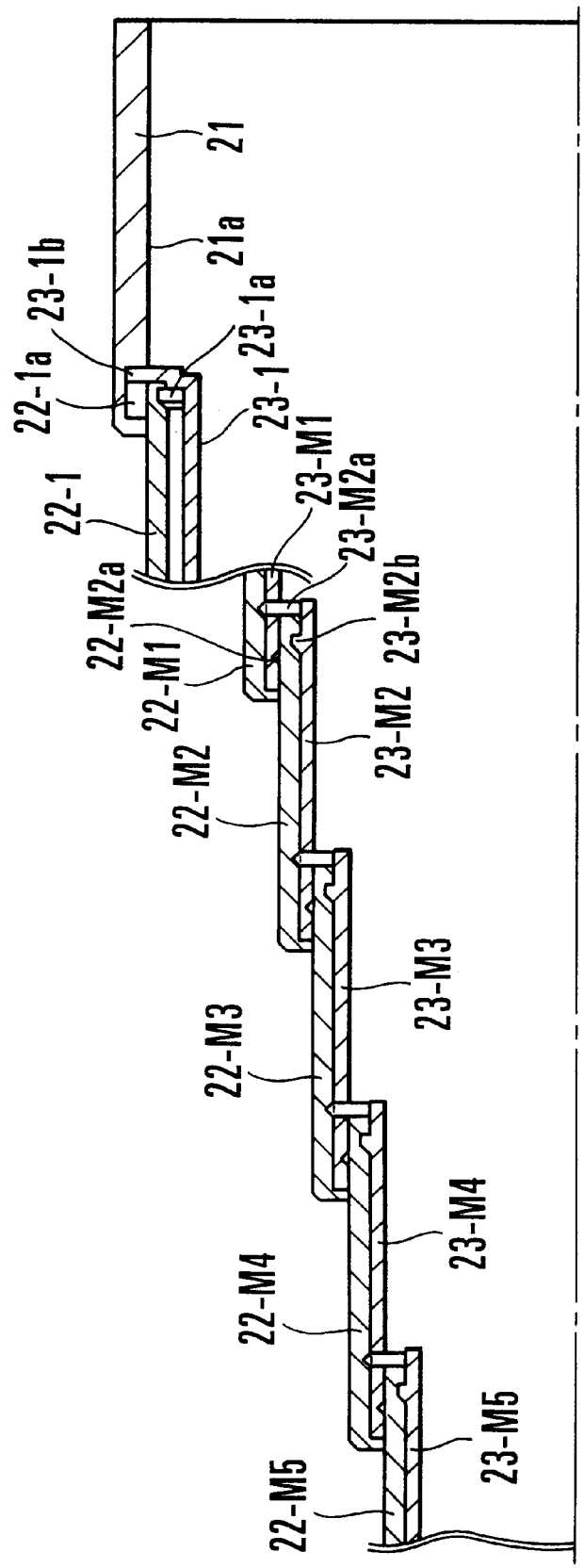
FIG. 16 is a sectional view showing the essential parts of a zoom lens barrel according to a fourth embodiment of the invention when the zoom lens barrel is in its telephoto end position.

Referring to FIG. 16, on the side near to the optical-axis, i.e., on the inner side, of a fixed tube 21, there is arranged a rotary tube 22-1 of the first stage (corresponding to the first rotary tube 42 shown in FIG. 2A) to be movable in the optical axis direction. On the inner side of the first-stage rotary tube 22-1, there is disposed a first-stage rectilinear member 23-1 (corresponding to the first rectilinear member 45 shown in FIG. 2A). The first-stage rectilinear member 23-1 is prevented from rotating around the optical axis by the fixed tube 21 and is arranged to be movable only in the optical axis direction together with the first-stage rotary tube 22-1 in a relatively rotatable state. A first rotary tube 22-M1 (corresponding to the second rotary tube 43 shown in FIG. 2A) is disposed at an M-th (M>2) stage counted from the fixed tube 21. A first rectilinear member 23-M1 (corresponding to the second rectilinear member 46 shown in FIG. 2A) is disposed on the inner side of the first rotary tube 22-M1. A second rotary tube 22-M2 is disposed on the inner side of the first rectilinear member 23-M1. A second rectilinear member 23-M2 is disposed on the inner side of the second rotary tube 22-M2. A third rotary tube 22-M3 is disposed on the inner side of the second rectilinear member 23-M2. A third rectilinear member 23-M3 is disposed on the inner side of the third rotary tube 22-M3. A fourth rotary tube 22-M4 is disposed on the inner side of the third rectilinear member 23-M3. A fourth rectilinear member 23-M4 is disposed on the inner side of the fourth rotary tube 22-M4. A fifth rotary tube 22-M5 is disposed on the inner side of the fourth rectilinear member 23-M4. A fifth rectilinear member 23-M5 is disposed on the inner side of the fifth rotary tube 22-M5. These members are fitted into positions in the sequence mentioned above.

Each of the rotary tubes 22 has helical cam grooves (corresponding to the cam grooves 42*d* and 43*a* shown in FIG. 2A) formed on its inner surface. Each of the rectilinear members 23 has helical cam grooves (not shown) and straight through-hole slots (not shown) formed to extend in parallel with the optical axis.

The above members of the zoom lens barrel are arranged to have the camera in the so-called full flat state by being stowed inside the fixed tube 21 when the camera is not used for photo-taking.

The first-stage rotary tube 22-1 is arranged to move, relative to the fixed tube 21, in the optical axis direction, while being rotated by a rotative driving force received from the driving gear (70 shown in FIG. 2A) at a gear 22-1a formed on the outer side thereof. The movement of the first-stage rotary tube 22-1 is caused by the intermeshing of a male helicoid provided on the gear 22-1a and a female helicoid 21a provided on the inner surface of the fixed tube 21. Then, the movement of the first rotary tube 22-1 causes the first-stage rectilinear member 23-1 to move in the optical axis direction.

The first-stage rectilinear member 23-1 is mounted in a state of being rotatable relative to the rotary tube 22-1 by means of a locking part 23-1a. Further, the first-stage rectilinear member 23-1 is prevented from rotating by its projections 23-1b which engage straight grooves formed on the inner surface of the fixed tube 21. Accordingly, the first-stage rectilinear member 23-1 moves in the optical axis direction together with the first-stage rotary tube 22-1 without rotating relative to the fixed tube 21. Then, the rotative driving force imparted to the first rotary tube 22-1 is transmitted to the first rotary tube 22-M1 to cause the first rotary tube 22-M1 to rotate.

In this instance, the first rectilinear member 23-M1 is prevented from rotating by a rectilinear member of an (M−1)st stage (not shown) and thus does not rotate around the optical axis. The second rectilinear member 23-M2 is provided with a plurality of cam pins 23-M2a on its one side further away from the optical axis, i.e., on the outer side thereof. These cam pins 23-M2a engage a plurality of helical cam grooves (corresponding to the cam grooves 42d shown in FIG. 2A) formed on the inner side of the first rotary tube 22-M1. This engaging relation allows the second rectilinear member 23-M2 to move in the optical axis direction along the cam grooves. In this instance, the second rectilinear member 23-M2 is prevented from rotating by the first rectilinear member 23-M1 and thus does not rotate around the optical axis.

On the other hand, the second rotary tube 22-M2 is restricted in the optical axis direction by projections 23-M2b provided on the second rectilinear member 23-M2, in a state of being rotatable relative the second rectilinear member 23-M2. The second rotary tube 22-M2 is thus arranged to move in the optical axis direction together with the second rectilinear member 23-M2. At this time, a plurality of cam pins 22-M2a which are formed on the outer side of the second rotary tube 22-M2 engage helical cam grooves provided on the inner side of the first rectilinear member 23-M1. This engaging relation allows the second rotary tube 22-M2 to be driven to rotate around the optical axis.

Actions of members of the zoom lens barrel are also performed in the same manner as described above respectively for the (M+1)st stage, the (M+2)nd stage, the (M+3)rd stage and the (M+4)th stage.

Since the rectilinear members 23 are provided with helical cam grooves and straight through-hole parts, some interference area might arise between the helical cam groove and the straight through-hole part. Such an interference area, however, can be eliminated to ensure a smooth action by varying the widths or phases of these parts.

It is preferable, in respect of the strength of the lens barrel, to make the movement in the optical axis direction by means of the rectilinear members with the intermediate members arranged on the respective inner sides, as in the case of the fourth embodiment. However, the lens barrel may be arranged without having the intermediate members arranged for all the rectilinear members as in the fourth embodiment, as long as at least one of them is provided.

Figure 17:
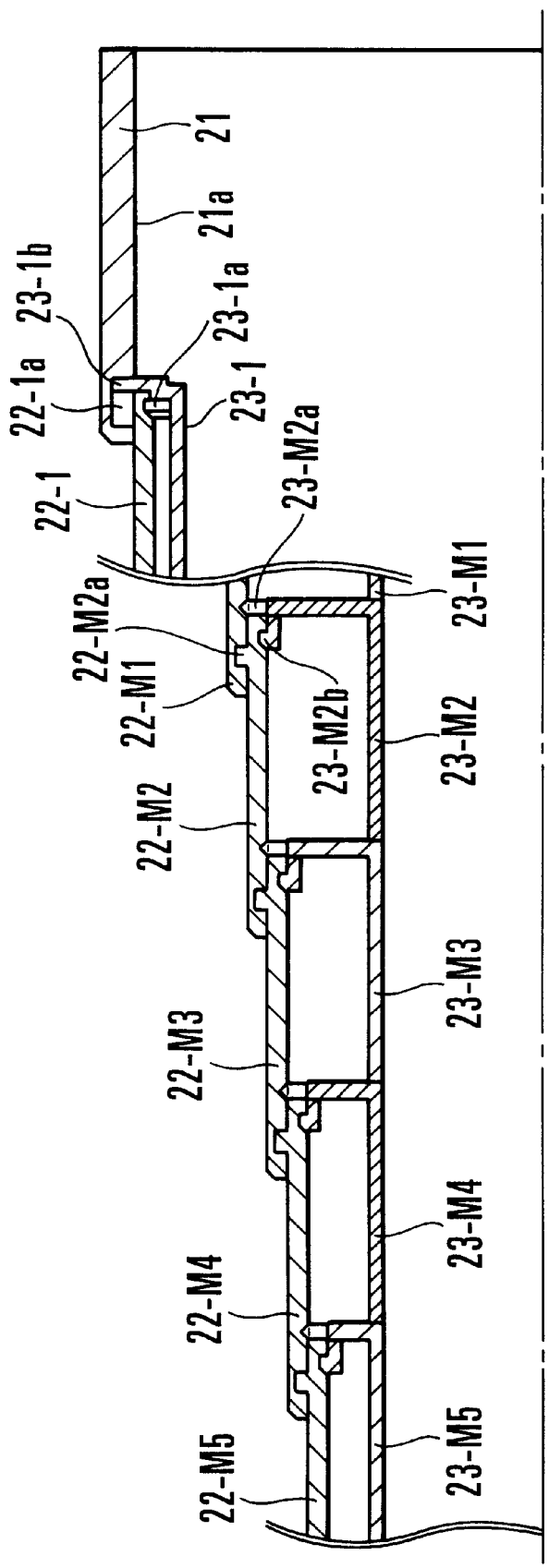
FIG. 17 is a sectional view showing the essential parts of a zoom lens barrel according to a first modification example of the fourth embodiment of the invention when the zoom lens barrel is in its telephoto end position.

FIGS. 17 and 18 relate to a first modification example of the fourth embodiment of the invention. To simplify description, all parts of the first modification example of the fourth embodiment that are the same as those of the fourth embodiment described in the foregoing are denoted by the same reference numerals used for the fourth embodiment. The following description covers only the points where the first modification example of the fourth embodiment differs from the fourth embodiment.

FIG. 17 is a sectional view showing the arrangement of essential parts of a zoom lens barrel according to the first modification example of the fourth embodiment when the zoom lens barrel is in its telephoto end position. FIG. 18 is a perspective view showing the arrangement of rectilinear members shown in FIG. 17.

In the first modification example of the fourth embodiment, the rotary tubes 22 are arranged one after another in the following manner. The second rotary tube 22-M2 is disposed on the inner side of the first rotary tube 22-M1, which is located at an M-th stage as counted from the fixed tube 21. The third rotary tube 22-M3 is disposed on the inner side of the second rotary tube 22-M2. The fourth rotary tube 22-M4 is disposed on the inner side of the third rotary tube 22-M3. The fifth rotary tube 22-M5 is disposed on the inner side of the fourth rotary tube 22-M4. On the inner side of the fifth rotary tube 22-M5 are disposed the first rectilinear member 23-M1, the second rectilinear member 23-M2, the third rectilinear member 23-M3, the fourth rectilinear member 23-M4 and the fifth rectilinear member 23-M5. The rectilinear members 23 are arranged to have the same inside diameter and are respectively allocated to correspond to the rotary tubes 22 of the corresponding stages. Each of the rotary tubes 22 is provided with helical cam grooves (not shown) and straight grooves (not shown) formed on its inner side. The rectilinear members 23 are formed to be partly inside each other, preferably, in about the same cylindrical shape, as shown in FIG. 18. These rectilinear members 23 are thus arranged to be within a space where they do not interfere with the rotary tubes 22.

When the first rotary tube 22-M1 rotates, since a plurality of cam pins 23-M2a which are mounted on the outer side of the second rectilinear member 23-M2 engage a plurality of helical cam grooves formed on the inner side of the first rotary tube 22-M1, this engaging relation then allows the second rectilinear member 23-M2 to move in the optical axis direction along the cam grooves.

The second rotary tube 22-M2 is restricted in the optical axis direction by projections 23-M2b provided on the second rectilinear member 23-M2 in a state of being rotatable relative to the second rectilinear member 23-M2. The second rotary tube 22-M2 thus moves in the optical axis direction together with the second rectilinear member 23-M2. In this instance, since at least one rotative driving pin 22-M2a disposed on the outer side of the second rotary tube 22-M2 engages a straight groove formed on the inner side of the first rotary tube 22-M1, this engaging relation allows the second rotary tube 22-M2 to be driven to rotate around the optical axis.

Other parts of arrangement and other actions of the first modification example of the fourth embodiment are the same as the fourth embodiment.

The provision of the helical cam grooves and the straight grooves on the inner side of each rotary tube 22 might bring about some interference area between them. However, a smooth operation of the lens barrel can be ensured by varying the width and phase of these grooves.

Figure 19:
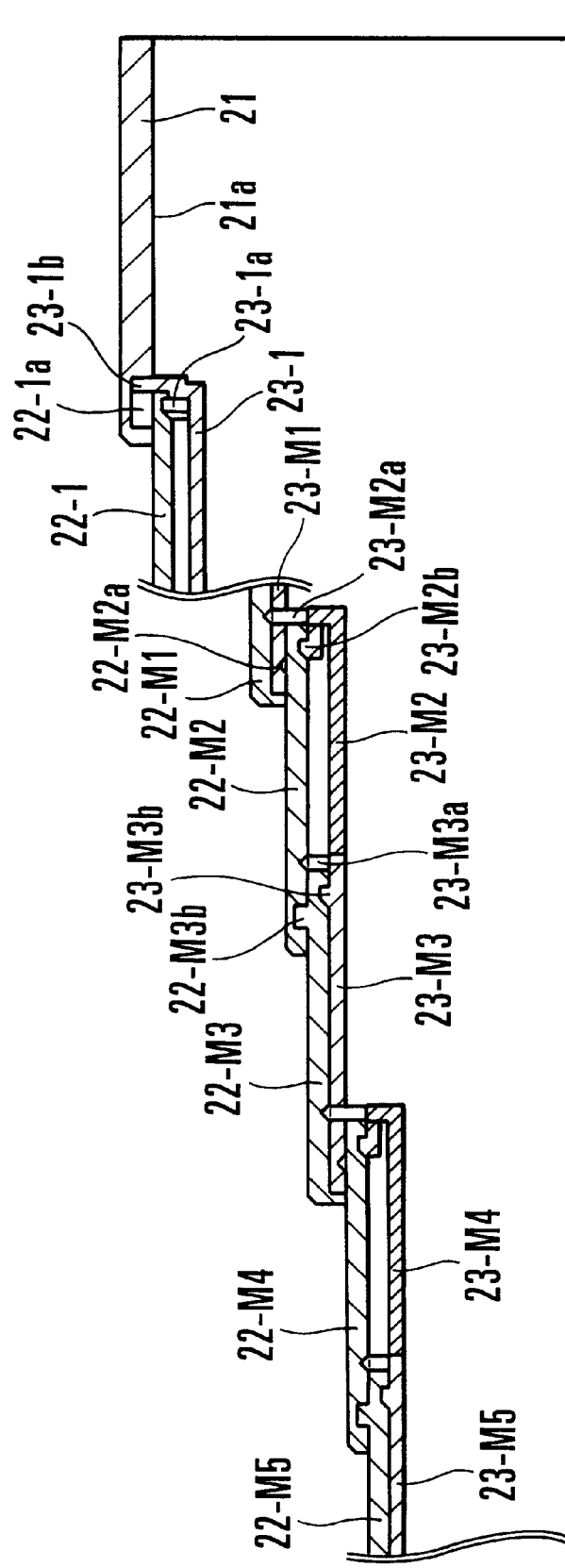
FIG. 19 is a sectional view showing the essential parts of a zoom lens barrel according to a second modification example of the fourth embodiment of the invention when the zoom lens barrel is in its telephoto end position.
Figure 20:
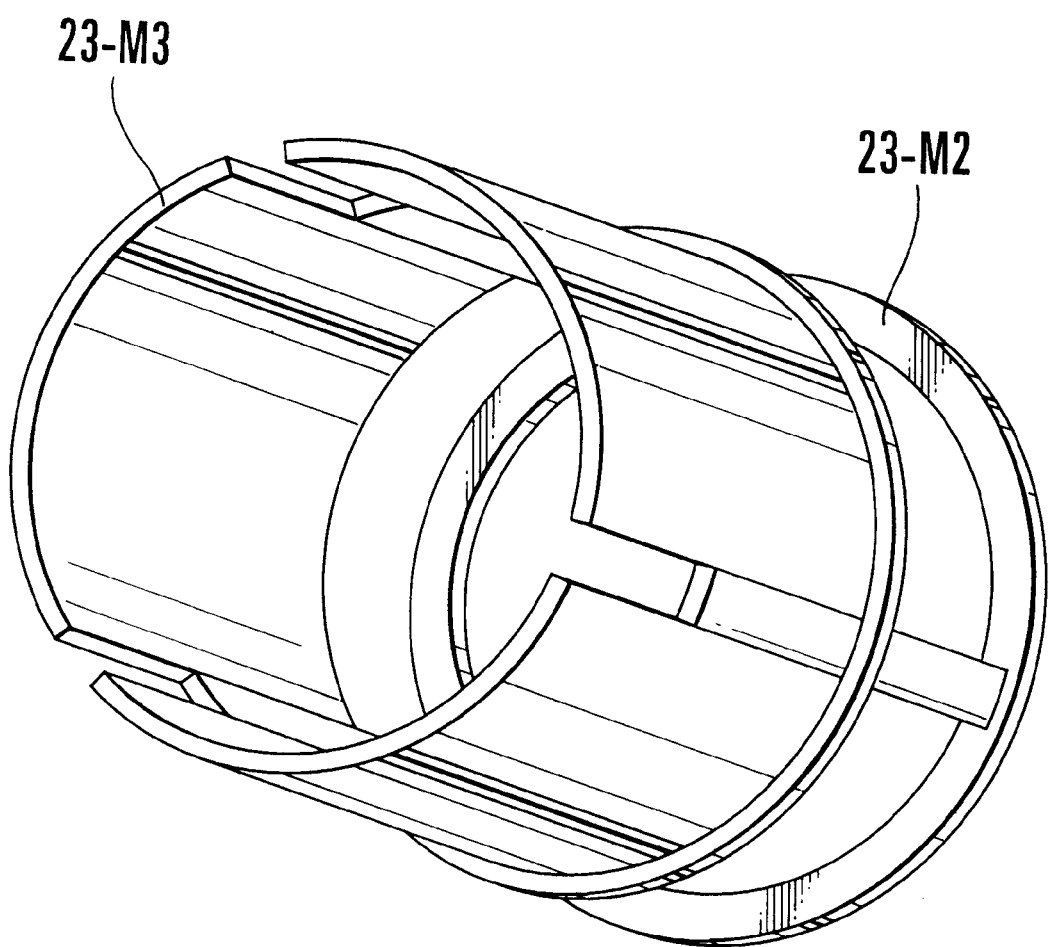
FIG. 20 is a perspective view showing in outline the arrangement of rectilinear members of the zoom lens barrel shown in FIG. 19.

FIGS. 19 and 20 relate to a second modification example of the fourth embodiment of the invention. FIG. 19 is a sectional view showing the essential parts of a zoom lens barrel according to the second modification example of the fourth embodiment when the zoom lens barrel is in its telephoto end position.

In the second modification example of the fourth embodiment, the first rotary tube 22-M1 is disposed at the M-th (M≧2) stage as counted from the fixed tube 21. The first rectilinear member 23-M1 is disposed on the inner side of the first rotary tube 22M1. The second rotary tube 22-M2 is disposed on the inner side of the first rectilinear member 23-M1. The third rotary tube 22-M3 is disposed on the inner side of the second rotary tube 22-M2. The second rectilinear member 23-M2 and the third rectilinear member 23-M3 are disposed on the inner side of the third rotary tube 22M3. The fourth rotary tube 22-M4 is disposed on the inner side of a space occupied by the second and third rectilinear members 23-M2 and 23-M3. The fifth rotary tube 22-M5 is disposed on the inner side of the fourth rotary tube 22-M4. The fourth and fifth rectilinear members 23-M4 and 23-M5 are disposed on the inner side of the fifth rotary tube 22-M5. These members are fitted into their positions in the sequence mentioned above. Each of the rotary tubes 22 is provided with helical cam grooves (not shown) formed on its inner side. The second and third rectilinear members 23-M2 and 23-M3 are formed to be partly inside of each other, as shown in FIG. 20.

When the second rotary tube 22-M2 rotates, the third rectilinear member 23-M3 does not rotate around the optical axis as it is prevented from rotating by the second rectilinear member 23-M2. A plurality of cam pins 23-M3a which are provided on the outer surface of the third rectilinear member 23-M3 engage the helical grooves provided on the inner side of the second rotary tube 22-M2. This engaging relation allows the third rectilinear member 23-M3 to move in the optical axis direction.

The third rotary tube 22-M3 is restricted in the optical axis direction by projections 23-M3b provided on the third rectilinear member 23-M3 in a state of being capable of making relative rotation. The third rotary tube 22-M3 thus moves in the optical axis direction together with the third rectilinear member 23-M3. At this time, since at least one rotative driving pin 22-M3b which is provided on the outer side of the third rotary tube 22-M3 engages a straight groove provided on the inner side of the second rotary tube 22-M2, this engaging relation allows the third rotary tube 22-M3 to be driven to rotate around the optical axis.

After that, the (M+3)rd stage part of the zoom lens barrel is driven in the same manner as the (M+1)st stage part. The (M+4)th stage part is driven in the same manner as the (M+2)nd stage part.

Other parts of arrangement and other actions of the second modification example of the fourth embodiment are the same as the fourth embodiment.

As mentioned above, each of the rotary tubes 22 is provided with the helical cam grooves and the straight grooves on its inner side while each of the rectilinear members 23 is also provided with the helical grooves and the straight through-hole slots. These grooves might bring about some interference area. However, a smooth operation of the lens barrel can be ensured by varying the width and phase of these grooves.

Further, in the case of the second modification example of the fourth embodiment, two adjacent stage parts of the zoom lens barrel are allocated with interconnecting lens barrel parts in a manner as in the case of the fourth embodiment. However, the number of interconnected stage parts is not limited to two stages. The arrangement may be changed to interconnect any desired number of stage parts.

Figure 21:
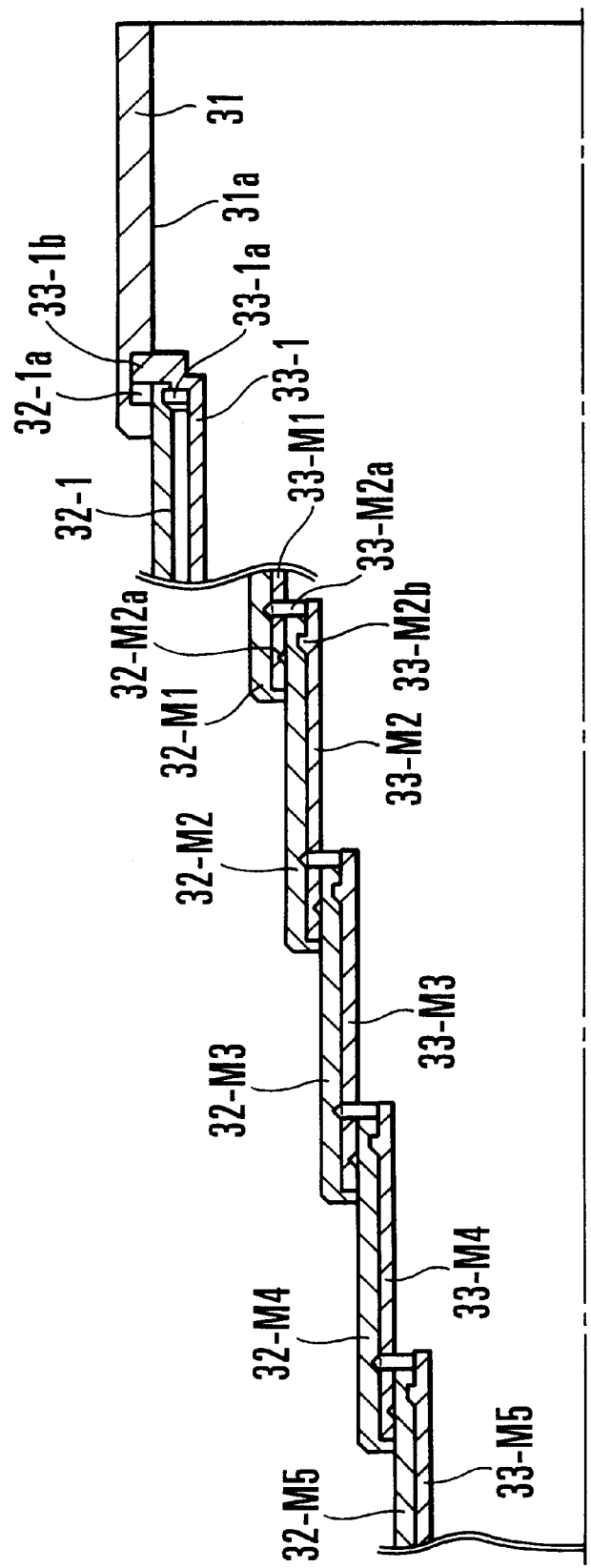
FIG. 21 is a sectional view showing the essential parts of a zoom lens barrel according to a fifth embodiment of the invention when the zoom lens barrel is in its telephoto end position.

FIG. 21 a sectional view showing the essential parts of a zoom lens barrel according to a fifth embodiment of the invention when the zoom lens barrel is in its telephoto end position.

The zoom lens barrel according to the fifth embodiment is arranged to be drawn out by n stages (n≧3). The zoom lens barrel is composed of one fixed tube, one forefront tube, n−1 rectilinear tubes and n−1 rotative driving members, and is thus arranged to be drawn out by n stages.

The details of arrangement of the zoom lens barrel according to the fifth embodiment are as follows. On the inner side of a fixed tube 31, a first-stage rectilinear tube 32-1 is arranged to be movable in the optical axis direction without rotating around the optical axis as it is prevented from rotating by the fixed tube 31. A first-stage rotary driving member 33-1 is arranged on the inner side of the first-stage rectilinear tube 32-1 to be movable in the optical axis direction together with the first-stage rectilinear tube 32-1 in a state of being rotatable relative thereto. A first rectilinear tube 32-M1 is disposed at the M-th stage (M≧2) as counted from the fixed tube 31. A first rotary driving member 33-M1 is disposed on the inner side of the first rectilinear tube 32-M1. A second rectilinear tube 32-M2 is disposed on the inner side of the first rotary driving member 33-M1. A second rotary driving member 33-M2 is disposed on the inner side of the second rectilinear tube 32-M2. A third rectilinear tube 32-M3 is disposed on the inner side of the second rotary driving member 33-M2. A third rotary driving member 33M3 is disposed on the inner side of the third rectilinear tube 32-M3. A fourth rectilinear tube 32-M4 is disposed on the inner side of the third rotary driving member 33M3. A fourth rotary driving member 33-M4 is disposed on the inner side of the fourth rectilinear tube 32-M4. A fifth rectilinear tube 32-M5 is disposed on the inner side of the fourth rotary driving member 33-M4. A fifth rotary driving member 33-M5 is disposed on the inner side of the fifth rectilinear tube 32-M5. These tubes and members are serially fitted into their stage positions one after another as shown in FIG. 21.

Each of the rectilinear tubes 32 is provided with helical cam grooves (not shown) formed on the inner side thereof. Each of the rotary driving members 33 is provided with helical cam grooves (not shown) and straight through-hole parts (not shown) which extend in parallel with the optical axis.

When the camera on which the zoom lens barrel is mounted is not used for photo-taking, the tubes and members are stowed inside of the fixed tube 31 to allow the camera to be in a so-called full flat state.

Further, when the first-stage rotary driving member 33-1 receives a driving force from a drive source (not shown) at a gear 33-1b which is formed on the outer surface thereof, the first-stage rotary driving member 33-1 moves in the optical axis direction while it is rotating with respect to the fixed tube 31. The movement of the first-stage rotary driving member 33-1 is caused by intermeshing of a male helicoid formed on the gear 33lb and a female helicoid 31a formed on the inner side of the fixed tube 31. The first-stage rectilinear tube 32-1 moves in the optical axis direction together with the movement of the first-stage rotary driving member 33-1.

The first-stage rectilinear tube 32-1 is mounted on the rotary driving member 33-1 at a locking part 33-1a in such a way as to be rotatable with respect to the rotary driving member 33-1. The first-stage rectilinear tube 32-1 is prevented from rotating by the fixed tube 31 at projections 32-1a and is arranged to move in the direction of optical axis together with the rotary driving member 33-1 without rotating with respect to the fixed tube 31. The first rotary driving member 33-M1 rotates when a rotary driving force imparted to the first-stage rotary driving member 33-1 is transmitted to the first rotary driving member 33-M1.

At that time, the first rectilinear tube 32-M1 is prevented from rotating around the optical axis by an action which will be described later therein. A plurality of cam pins 33-M2a which are provided on the outer side of the second rotary driving member 33-M2 engage a plurality of helical cam grooves formed on the inner side of the first rectilinear tube 32-M1 while they engage also straight through-hole parts provided in the first rotary driving member 33-M1. This engaging relation allows the second rotary driving member 33-M2 to move in the optical axis direction along the helical cam grooves.

The second rectilinear tube 32-M2 is restricted in the optical axis direction in a state of being rotatable relative to the second rotary driving member 33-M2 by the second rotary driving member 33-M2 and projections 33-M2b provided on the second rotary driving member 33-M2. The second rectilinear tube 32-M2 is thus arranged to move together with the second rotary driving member 33-M2 in the optical axis direction. At this time, a plurality of cam pins 32-M2a which are provided on the outer side of the second rectilinear tube 32-M2 engage helical cam grooves provided on the inner side of the first rotary driving member 33-M1. This engaging relation prevents the second rectilinear tube 32-M2 from rotating around the optical axis. The cam grooves provided on the inner side of the first rotary driving member 33-M1 are machined in such a way as to have lead in the direction opposite to the lead of the helical cam grooves formed on the inner side of the first rectilinear tube 32-M1.

Actions of the elements of the zoom lens barrel are also performed in the same manner as described above respectively for the (M+1)st stage, the (M+2)nd stage, the (M+3)rd stage and the (M+4)th stage.

Since the rotary driving members 33 are provided with helical cam grooves and straight through-hole parts, some interference area might arise between the helical cam groove and the straight through-hole part. The possibility of having such an interference area can be eliminated to ensure a smooth action by adjusting and varying the widths or phases of these parts.

It is preferable, in respect of the strength of the lens barrel, to make the movement in the optical axis direction by means of the rotary driving members with the intermediate members arranged on the inner sides of all of them, as in the case of the fifth embodiment. However, the lens barrel may be arranged without having the intermediate members arranged for all the rotary driving members, as long as at least one of them is arranged to have the intermediate member.

Figure 22:
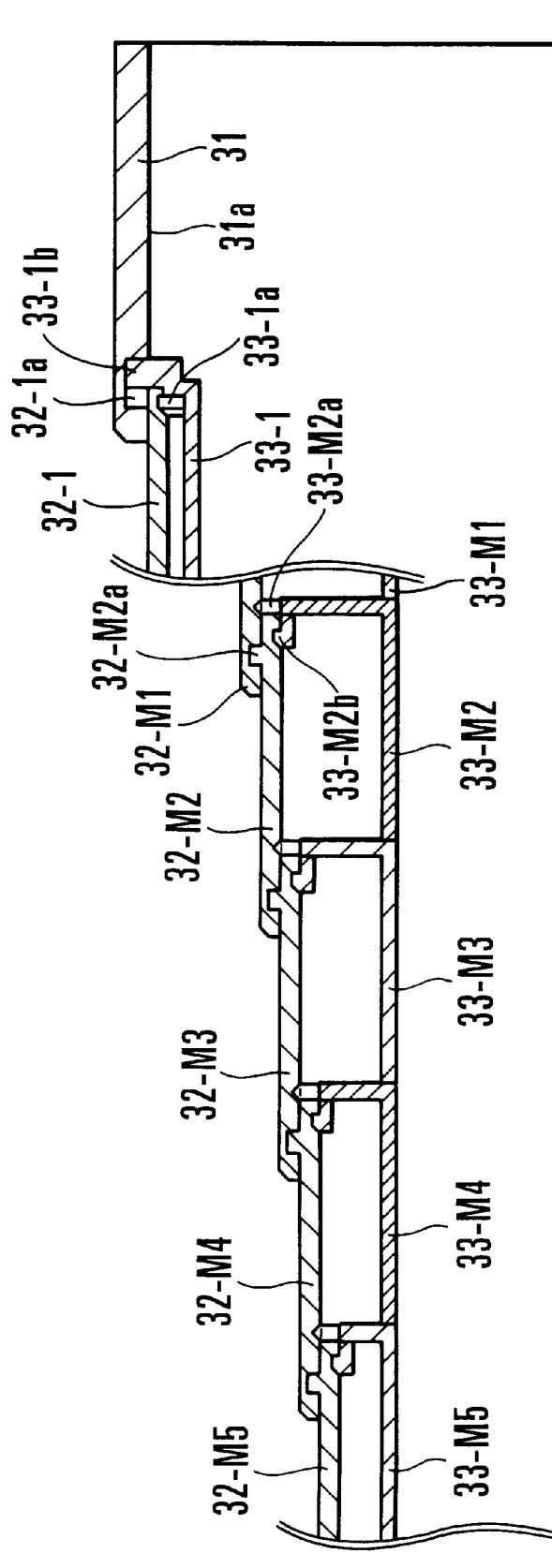
FIG. 22 is a sectional view showing the essential parts of a zoom lens barrel according to a first modification example of the fifth embodiment of the invention when zoom lens barrel is in its telephoto end position.

FIG. 22 relates to a first modification example of the fifth embodiment. To simplify the description, all parts of the first modification example of the fifth embodiment that are the same as those of the fifth embodiment are indicated by the same reference numerals as the fifth embodiment, and the following description of the first modification example of the fifth embodiment covers only such parts that differ from those of the fifth embodiment.

FIG. 22 is a sectional view showing the essential parts of a zoom lens barrel according to the first modification example of the fifth embodiment when the zoom lens barrel is in its telephoto end position.

In the case of the first modification example of the fifth embodiment, the second rectilinear tube 32-M2 is disposed on the inner side of the first rectilinear tube 32-M1, which is located at the M-th stage as counted from the fixed tube 31. The third rectilinear tube 32-M3 is disposed on the inner side of the second rectilinear tube 32-M2. The fourth rectilinear tube 32-M4 is disposed on the inner side of the third rectilinear tube 32-M3. The fifth rectilinear tube 32-M5 is disposed on the inner side of the fourth rectilinear tube 32-M4. These rectilinear tubes are thus fitted in their serial positions one after another. On the inner side of the fifth rectilinear tube 32-M5, there are arranged the first rotary driving member 33-M1, the second rotary driving member 33-M2, the third rotary driving member 33-M3, the fourth rotary driving member 33-M4 and the fifth rotary driving member 33-M5. These rotary driving members are arranged to have the same inside diameter and are respectively allocated to correspond to the rectilinear tubes 32 of the corresponding stages. Each of the rectilinear tubes 32 is provided with helical cam grooves (not shown) and straight grooves (not shown) formed on its inner side. The rotary driving members 33 are formed to be partly inside of each other, preferably in about the same cylindrical shape, like the rectilinear members of the first modification example of the fourth embodiment shown in FIG. 18. These rotary driving members 33 are thus arranged to be within a space where they do not interfere with the rectilinear tubes 32.

When the first rotary driving member 33-M1 rotates, the first rectilinear tube 32-M1 does not rotate around the optical axis as it is prevented from rotating by the rectilinear tube of the (M−1)th stage (not shown). A plurality of cam pins 33-M2a which are mounted on the outer side of the second rotary driving member 33-M2 engage a plurality of helical cam grooves formed on the inner side of the first rectilinear tube 32-M1. This engaging relation allows the second rotary driving member 33-M2 to move in the optical axis direction along the above-stated cam grooves.

The second rectilinear tube 32-M2 is restricted in the optical axis direction in a state of being allowed to rotate relative to the second rotary driving member 33-M2 by the second rotary driving member 33-M2 and projections 33-M2b provided on the second rotary driving member 33-M2. The second rectilinear tube 32-M2 is thus arranged to move together with the second rotary driving member 33-M2 in the optical axis direction. At this time, since at least one cam pin 32-M2a which is provided on the outer side of the second rectilinear tube 32-M2 engages a straight groove provided on the inner side of the first rectilinear tube 32-M1, this engaging relation prevents the second rectilinear tube 32-M2 from rotating.

Actions of the members of the lens barrel are also performed in the same manner as described above respectively for the (M+1)st stage, the (M+2)nd stage, the (M+3)rd stage and the (M+4)th stage.

Other parts of arrangement and actions of the first modification example of the fifth embodiment are the same as the fifth embodiment.

Since the rotary driving members 33 are provided with helical cam grooves and straight through-hole parts, some interference area might take place between the helical cam groove and the straight through-hole part. Such an interference area, however, can be eliminated to ensure a smooth action by adjusting and varying the widths or phases of these parts.

Figure 23:
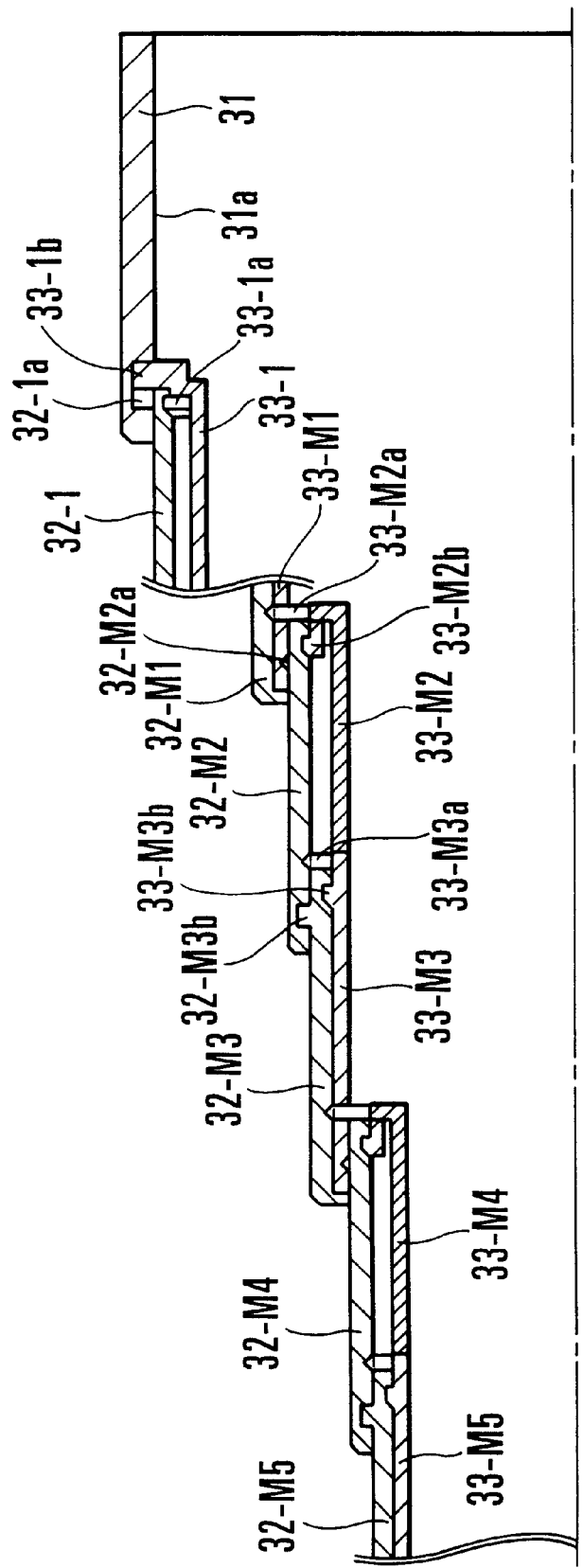
FIG. 23 is a sectional view showing the essential parts of a zoom lens barrel according to a second modification example of the fifth embodiment of the invention when zoom lens barrel is in its telephoto end position.

FIG. 23 is a sectional view showing the essential parts of a zoom lens barrel according to a second modification example of the fifth embodiment when the zoom lens barrel is in its telephoto end position.

In the case of the second modification example of the fifth embodiment, the first rotary driving member 33-M1 is disposed on the inner side of the first rectilinear tube 32-M1, which is located at the M-th stage as counted from the fixed tube 31. The second rectilinear tube 32-M2 is disposed on the inner side of the first rotary driving member 33-M1. The third rectilinear tube 32-M3 is disposed on the inner side of the second rectilinear tube 32-M2. The second and third rotary driving members 33-M2 and 33-M3 are disposed on the inner side of the third rectilinear tube 32-M3. The fourth rectilinear tube 32-M4 is disposed on the inner side of the third rectilinear tube 32-M3 inside of a space occupied by the second and third rotary driving members 33-M2 and 33-M3. The fifth rectilinear tube 32MS is disposed on the inner side of the fourth rectilinear tube 32-M4. The fourth and fifth rotary driving members 33-M4 and 33-MS are disposed on the inner side of the fifth rectilinear tube 32-M5. These parts are thus fitted in their serial positions one after another.

Each of the rectilinear tubes 32 is provided with helical cam grooves (not shown) formed on its inner side. The first and second rotary driving members 33-M1 and 33-M2 are formed to be partly inside of each other in a manner similar to the rectilinear members in the second modification example of the fourth embodiment shown in FIG. 20.

When the second rectilinear tube 32-M2 and the second rotary driving member 33-M2 are in a state of moving in the optical axis direction, the third rotary driving member 33-M3 is driven by the second rotary driving member 33-M2 to rotate around the optical axis. A plurality of cam pins 33-M3a provided on the outer side z of the third rotary driving member 33-M3 engage a plurality of helical cam grooves formed on the inner side of the second rectilinear tube 32-M2. This engaging relation allows the third rotary driving member 33-M3 to move in the optical axis direction along the cam grooves.

The third rectilinear tube 32-M3 is restricted in the optical axis direction in a state of being caused by the third rotary driving member 33-M3 and projections 33-M3b provided on the third rotary driving member 33-M3 to be rotatable relative to the third rotary driving member 33-M3. The third rectilinear tube 32-M3 is thus arranged to move in the optical axis direction together with the third rotary driving member 33-M3. At this time, since at least one rectilinear pin 32-M3b provided on the outer side of the third rectilinear tube 32-M3 engages a straight cam groove provided on the inner side of the second rectilinear tube 33-M2, this engaging relation prevents the third rectilinear tube 32-M3 from rotating.

Actions of the members of the lens barrel are also performed in the same manner as described above respectively for the (M+1)st stage, the (M+2)nd stage, the (M+3)rd stage and the (M+4)th stage.

Other parts of arrangement and actions of the second modification example of the fifth embodiment are the same as the fifth embodiment.

Since the rectilinear tubes 33 are provided with helical cam grooves and straight through-hole parts, some interference area might take place between the helical cam groove and the straight through-hole part. Such an interference area, however, can be eliminated to ensure a smooth action by adjusting and varying the widths or phases of these parts.

Further, in the case of the second modification example of the fifth embodiment, two adjacent stage parts of the lens barrel are allocated with interconnecting lens barrel parts in the same manner as in the case of the fifth embodiment. However, the number of interconnected stage parts is not limited to two stages. The arrangement may be changed to interconnect any desired number of stage parts.

As has been described above, according to the arrangement of the invention, it is possible to prevent the strength of the lens barrel from lowering, since any helical through-holes, which would be provided in the rectilinear member in the case of the conventional arrangement, are omitted. Further, since any space which is provided between two rotary tubes is made unnecessary, it is possible to reduce the size of the zoom lens barrel in the direction of its diameter.

What is claimed is:

1. A zoom lens barrel comprising:

a fixed tube provided at a camera body;

a first rotary tube arranged to move in an optical axis direction relative to said fixed tube and rotate around the optical axis during zooming, said first rotary tube having a helical groove formed on an inner surface thereof, a first rectilinear member disposed inside said first rotary tube and arranged to rectilinearly move in the optical axis direction integrally with said first rotary tube;

a second rotary tube disposed inside said first rotary tube and arranged to rotate in the same rotating direction as that of said first rotary tube in association with rotation of said first rotary tube; and a second rectilinear member disposed inside said second rotary tube, having a projecting part engaging said helical groove and prevented by said first rectilinear member from rotating around the optical axis, wherein the rotation of said first rotary tube causes said second rectilinear member to move in the optical axis direction according to a locus of said helical groove, thereby causing said second rotary tube to move in the optical axis direction.

2. A zoom lens barrel according to claim 1, further comprising a forefront tube prevented by said second rectilinear member from rotating around the optical axis and arranged to move in the optical axis direction according to a cam groove formed on an inner surface of said second rotary tube.

3. A zoom lens barrel according to claim 2, wherein said forefront tube holds a first lens unit.

4. A zoom lens barrel according to claim 3, wherein, on the inner surface of the second rotary tube, there is formed a cam groove for moving a second lens unit.

5. A zoom lens barrel comprising:

a fixed tube provided at a camera body;

a first rotary member arranged to move in an optical axis direction relative to said fixed tube and rotate around the optical axis during zooming;

a first rectilinear tube disposed outside said first rotary member and arranged to rectilinearly move in the optical axis direction integrally with said first rotary member without rotating around the optical axis relative to said fixed tube, said first rectilinear tube having a helical groove formed on an inner surface thereof;

a second rectilinear tube disposed inside said first rectilinear tube and arranged to rectilinearly move in the optical axis direction while being prevented by said first rectilinear tube from rotating; and a second rotary member disposed inside said second rectilinear tube, having a projecting part engaging said helical groove and arranged to rotate in the same direction as that of the rotation of said first rotary member, wherein the rotation of said second rotary member with said projecting part engaging said helical groove causes said second rectilinear tube to move in the optical axis direction.

6. A zoom lens barrel comprising:

a forefront tube movable in an optical axis direction and disposed in the forefront of said zoom lens barrel;

a tubular member fixed t o a camera body; and a plurality of intermediate members ar range d to connect said tubular member and said forefront tube with each other, each of said plurality of intermediate members including a rotary member movable in the optical axis direction while rotating around the optical axis, and a rectilinear member movable in the optical axis direction without rotating around the optical axis, wherein, in each intermediate member corresponding to a second or further stage, counted from said tubular member toward said forefront tube, of said plurality of intermediate members, said rectilinear member is disposed nearer to the optical axis than said rotary member and is arranged to receive a driving force in the optical axis direction and cause said rotary member to move in the optical axis direction in a state of being rotatable relative to said rectilinear member.

7. A zoom lens barrel according to claim 6, wherein said rotary member and said rectilinear member are disposed adjacent to each other in a direction of diameter of said zoom lens barrel.

8. A zoom lens barrel according to claim 6, wherein said rectilinear member of a certain intermediate member is disposed nearer to the optical axis than said rotary member of an intermediate member located adjacent to said certain intermediate member toward said forefront tube.

9. A zoom lens barrel comprising:

a forefront tube movable in an optical axis direction and disposed in the forefront of said zoom lens barrel;

a tubular member fixed to a camera body; and a plurality of intermediate members arranged to connect said tubular member and said forefront tube with each other, each of said plurality of intermediate members including a rotary member movable in the optical axis direction while rotating around the optical axis, and a rectilinear member movable in the optical axis direction without rotating around the optical axis, wherein, in each intermediate member corresponding to a second or further stage, counted from said tubular member toward said forefront tube, of said plurality of intermediate members, said rotary member is disposed nearer to the optical axis than said rectilinear member and is arranged to receive a driving force in the optical axis direction and cause said rectilinear member to move in the optical axis direction in a state of being rotatable relative to said rotary member.

10. A zoom lens barrel according to claim 9, wherein said rotary member and said rectilinear member are disposed adjacent to each other in a direction of diameter of said zoom lens barrel.

11. A zoom lens barrel according to claim 9, wherein said rotary member of a certain intermediate member is disposed nearer to the optical axis than said rectilinear member of an intermediate member located adjacent to said certain intermediate member toward said forefront tube.

12. A zoom lens barrel comprising:

a forefront tube movable in an optical axis direction without rotating around the optical axis and disposed in the forefront of said zoom lens barrel;

a tubular member fixed to a camera body; and a plurality of intermediate members arranged to connect said tubular member and said forefront tube with each other, each of said plurality of intermediate members including a rotary member movable in the optical axis direction while rotating around the optical axis, and a rectilinear member movable in the optical axis direction without rotating around the optical axis, said rectilinear members including a first rectilinear member and a second rectilinear member, said first rectilinear member being arranged to prevent said second rectilinear member from rotating around the optical axis, said second rectilinear member being arranged to prevent said forefront tube from rotating around the optical axis, said rotary members including a moving rotary tube arranged to be movable in the optical axis direction together with said second rectilinear member while rotating around the optical axis and arranged to be capable of containing said forefront tube, wherein said second rectilinear member is disposed nearer to the optical axis than said moving rotary tube.

13. A zoom lens barrel according to claim 12, wherein said first rectilinear member is disposed nearer to the optical axis than said second rectilinear member.

14. A zoom lens barrel according to claim 12, wherein an outer surface of said first rectilinear member is disposed nearer to the optical axis than an outer surface of said second rectilinear member.

15. A zoom lens barrel according to claim 12, wherein said first rectilinear member and said second rectilinear member are disposed approximately on one and the same circumference.

16. A zoom lens barrel according to claim 12, wherein an outer surface of said first rectilinear member is disposed nearer to the optical axis than an outer surface of said forefront tube.

* * * * *

UNITED STATES PATENT AND TRADEMARK OFFICE
CERTIFICATE OF CORRECTION

PATENT NO. : 6,115,190
DATED : September 5, 2000
INVENTOR(S) : Futoshi Hirai

It is certified that error appears in the above-identified patent and that said Letters Patent is hereby corrected as shown below:

Column 5,
Line 9, delete "7".

Column 6,
Line 37, delete "the the zoom" and insert -- the zoom --.

Column 14,
Line 41, delete "M>2" and insert -- M$\geq$2 --.

Column 17,
Line 15, delete "22M1" and insert -- 22-M1 --.

Column 18,
Lines 35 and 38, delete "33M3" and insert -- 33-M3 --.
Line 63, delete "33lb" and insert -- 33-lb --.

Column 21,
Line 18, delete "32MS" and insert -- 32-M5 --.
Line 20, delete "32-MS" and insert -- 32-M5 --.
Line 35, delete "z".

Column 23,
Line 13, delete "t o" and insert -- to --.
Line 15, delete "ar range d" and insert -- arranged --.

Signed and Sealed this

Twenty-seventh Day of November, 2001

Attest:

NICHOLAS P. GODICI
Attesting Officer    Acting Director of the United States Patent and Trademark Office